(12) United States Patent
Tomioka

(10) Patent No.: US 9,239,266 B2
(45) Date of Patent: Jan. 19, 2016

(54) TERAHERTZ WAVE DETECTING DEVICE, CAMERA, IMAGING APPARATUS AND MEASURING APPARATUS

(71) Applicant: SEIKO EPSON CORPORATION, Tokyo (JP)

(72) Inventor: Hiroto Tomioka, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/296,248

(22) Filed: Jun. 4, 2014

(65) Prior Publication Data

US 2014/0361178 A1    Dec. 11, 2014

(30) Foreign Application Priority Data

Jun. 5, 2013   (JP) .................. 2013-118565

(51) Int. Cl.
| | |
|---|---|
| *G01J 5/02* | (2006.01) |
| *G01J 5/10* | (2006.01) |
| *G01J 5/34* | (2006.01) |
| *G01J 5/08* | (2006.01) |

(52) U.S. Cl.
CPC .................. *G01J 5/10* (2013.01); *G01J 5/0853* (2013.01); *G01J 5/34* (2013.01)

(58) Field of Classification Search
CPC ............. G01J 5/34; G01J 5/0853; G01J 5/10; G01J 5/12; G01J 5/58
USPC ........................................................ 250/349
See application file for complete search history.

(56) References Cited

U.S. PATENT DOCUMENTS

| | | | | |
|---|---|---|---|---|
| 5,602,393 | A | * | 2/1997 | Gerard ....................... 250/338.4 |
| 5,760,398 | A | * | 6/1998 | Blackwell et al. ............ 250/332 |
| 6,690,014 | B1 | * | 2/2004 | Gooch et al. ................ 250/338.4 |
| 8,362,430 | B1 | | 1/2013 | Williams et al. |
| 8,750,653 | B1 | * | 6/2014 | Peters et al. ..................... 385/12 |
| 2006/0060784 | A1 | * | 3/2006 | Moon et al. ................. 250/338.1 |
| 2007/0108383 | A1 | * | 5/2007 | Combes et al. ............. 250/338.1 |
| 2008/0237469 | A1 | * | 10/2008 | Oda et al. .................. 250/339.02 |

(Continued)

FOREIGN PATENT DOCUMENTS

| | | |
|---|---|---|
| GB | 2 173 038 A | 10/1986 |
| JP | 2009-141661 A | 6/2009 |

(Continued)

OTHER PUBLICATIONS

European Search Report dated Oct. 15, 2014 as received in Application No. EP 14 170 901.4.

*Primary Examiner* — Mark R Gaworecki
*Assistant Examiner* — Taeho Jo
(74) *Attorney, Agent, or Firm* — Maschoff Brennan

(57) ABSTRACT

A terahertz wave detecting device includes: a substrate; and a plurality of detection elements that is arranged above the substrate, wherein the detection element includes an absorbing section that absorbs a terahertz wave to generate heat, and a converting section that converts the heat generated in the absorbing section into an electric signal, wherein the absorbing section includes a dielectric layer, a first metal layer that is provided on a surface of the dielectric layer, and a second metal layer that is provided on the other surface of the dielectric layer, and wherein the plurality of detection elements is arranged so that the terahertz wave that is diffracted between the adjacent absorbing sections is incident onto the dielectric layer.

16 Claims, 14 Drawing Sheets

(56) References Cited

U.S. PATENT DOCUMENTS

| | | | |
|---|---|---|---|
| 2009/0095908 A1* | 4/2009 | Bollhorst | 250/338.3 |
| 2010/0276597 A1* | 11/2010 | Ouvrier-Buffet | 250/349 |
| 2011/0194100 A1* | 8/2011 | Thiel et al. | 356/51 |
| 2011/0315880 A1* | 12/2011 | Nemirovsky | 250/340 |
| 2012/0153151 A1* | 6/2012 | Dumont et al. | 250/338.1 |
| 2012/0161003 A1* | 6/2012 | Tsuchiya | 250/338.3 |
| 2012/0211858 A1* | 8/2012 | Tsuchiya | 257/467 |
| 2012/0217401 A1* | 8/2012 | Noda | 250/338.3 |
| 2012/0235045 A1* | 9/2012 | Kurashina et al. | 250/353 |
| 2012/0257204 A1* | 10/2012 | Walters | 356/445 |
| 2012/0280345 A1* | 11/2012 | Zhu et al. | 257/432 |
| 2013/0032717 A1* | 2/2013 | Saito | 250/338.1 |
| 2013/0099118 A1* | 4/2013 | Tomioka | 250/332 |
| 2013/0112876 A1* | 5/2013 | Nam et al. | 250/338.1 |
| 2013/0146772 A1* | 6/2013 | N'Guyen et al. | 250/349 |
| 2013/0146773 A1* | 6/2013 | Ouvrier-Buffet et al. | 250/349 |
| 2013/0161515 A1* | 6/2013 | Park et al. | 250/338.1 |
| 2014/0226021 A1* | 8/2014 | Koechlin et al. | 348/165 |
| 2014/0319357 A1* | 10/2014 | Ogawa et al. | 250/349 |
| 2014/0326883 A1* | 11/2014 | Abdolvand et al. | 250/338.1 |

FOREIGN PATENT DOCUMENTS

| | | |
|---|---|---|
| JP | 2011-099715 A | 5/2011 |
| JP | 2012-037407 A | 2/2012 |
| JP | 2013-044703 A | 3/2013 |

\* cited by examiner

TERAHERTZ WAVE DETECTING DEVICE, CAMERA, IMAGING APPARATUS AND MEASURING APPARATUS

BACKGROUND

1. Technical Field

The present invention relates to a terahertz wave detecting device, a camera, an imaging apparatus and a measuring apparatus.

2. Related Art

An optical sensor that absorbs light to convert the light into heat and converts the heat into an electric signal has been used. Further, an optical sensor in which sensitivity with respect to a specific wavelength is improved is disclosed in JP-A-2013-44703. According to this disclosure, the optical sensor includes an absorbing section that absorbs light to generate heat, and a converting section that converts the heat into an electric signal.

The absorbing section has a rectangular parallelepiped shape, in which irregularities are formed on one surface of the absorbing section in a lattice form with a predetermined interval. Light incident onto the absorbing section is diffracted or scattered, and thus, multiple absorption of light occurs. Further, light having a specific wavelength is absorbed in the absorbing section. Thus, the absorbing section can convert the light into heat in response to the light intensity of the light having the specific wavelength. One converting section is provided in one absorbing section. Further, the converting section converts a temperature change in the absorbing section into the electric signal. The specific wavelength has a wavelength of about 4 μm, and the interval of the irregularities is about 1.5 μm.

In recent years, a terahertz wave that is light having a frequency of 100 GHz to 30 THz has attracted attention. For example, the terahertz wave can be used for imaging, various measurements such as a spectral measurement, a nondestructive inspection or the like.

The terahertz wave is light having a long wavelength of 30 μm to 1 mm. When the terahertz wave is detected, according to the configuration disclosed in JP-A-2013-44703, the optical sensor increases in size. Further, since the thermal capacity of the absorbing section increases, the reaction rate is decreased, so that the detection accuracy of the optical sensor is lowered. Thus, there is a need for a terahertz wave detecting device capable of converting, even when a terahertz wave is detected, the terahertz wave into an electric signal with high accuracy.

SUMMARY

An advantage of some aspects of the invention is to solve the problems described above, and the invention can be implemented as the following forms or application examples.

APPLICATION EXAMPLE 1

This application example is directed to a terahertz wave detecting device including: a substrate; and a plurality of detection elements that is arranged above the substrate, in which the detection element includes an absorbing section that absorbs a terahertz wave to generate heat, and a converting section that converts the heat generated in the absorbing section into an electric signal, the absorbing section includes a dielectric layer, a first metal layer that is provided on a surface of the dielectric layer, and a second metal layer that is provided on the other surface of the dielectric layer, and the plurality of detection elements is arranged so that the terahertz wave that is diffracted between the adjacent absorbing sections is incident onto the dielectric layer.

According to this application example, the terahertz wave detecting device includes the substrate and the plural detection elements are arranged above the substrate. The detection element includes the absorbing section and the converting section. The absorbing section absorbs the terahertz wave to generate heat. The absorbing section generates the heat according to the intensity of the terahertz wave incident onto the absorbing section. The converting section converts the heat generated by the absorbing section into the electric signal. Accordingly, the converting section outputs the electric signal corresponding to the intensity of the terahertz wave incident onto the absorbing section.

The absorbing section has a structure in which the dielectric layer is interposed between the first metal layer and the second metal layer. When the terahertz wave is incident onto the dielectric layer, the terahertz wave travels inside the dielectric layer. The terahertz wave is reflected between the first metal layer, the dielectric layer and the second metal layer. Further, while the terahertz wave is traveling inside the dielectric layer while repeating the reflection, energy is absorbed in the dielectric layer and is converted into heat. Accordingly, the terahertz wave that is incident onto the terahertz wave detecting device is absorbed in the absorbing section with high efficiency, so that the energy is converted into the heat.

Since the detection elements are arranged, the first metal layers and the second metal layers are also arranged. Further, a portion between the adjacent first metal layers and a portion between the adjacent second metal layers function as a slit with respect to the terahertz wave. Accordingly, the terahertz wave changes the traveling direction to be incident onto the absorbing section with high efficiency. As a result, the terahertz wave detecting device can convert the incident terahertz wave into the electric signal with high accuracy.

APPLICATION EXAMPLE 2

This application example is directed to the terahertz wave detecting device according to the application example described above, wherein the first metal layers is arranged being spaced from each other at a predetermined interval, and the interval is shorter than a wavelength in vacuum of the terahertz wave absorbed by the absorbing section.

According to this application example, the first metal layers are arranged with the interval smaller than the wavelength of the terahertz wave in vacuum. Thus, since the interval between the adjacent first metal layers is narrow, the terahertz wave is easily diffracted. Accordingly, the terahertz wave can easily enter the inside of the absorbing section.

APPLICATION EXAMPLE 3

This application example is directed to the terahertz wave detecting device according to the application example described above, wherein the second metal layer is connected to a wiring that transmits the electric signal converted by the converting section.

According to this application example, the second metal layer is connected to the wiring that transmits the electric signal. Accordingly, the heat generated in the absorbing section is conducted to the second metal layer to be removed from the absorbing section. Accordingly, the heat is suppressed from remaining in the absorbing section, and thus, the terahertz wave detecting device can convert the incident terahertz wave into the electric signal with high responsiveness.

APPLICATION EXAMPLE 4

This application example is directed to the terahertz wave detecting device according to the application example described above, wherein a pillar portion that is made of metal and conducts the heat from the first metal layer to the second metal layer is provided between the first metal layer and the second metal layer.

According to this application example, the pillar portion made of metal is provided between the first metal layer and the second metal layer. Further, the heat of the first metal layer is conducted to the pillar portion, the second metal layer and the wiring to be removed from the absorbing section. Accordingly, since the heat is suppressed from remaining in the absorbing section, the terahertz wave detecting device can convert the incident terahertz wave into the electric signal with high responsiveness.

APPLICATION EXAMPLE 5

This application example is directed to the terahertz wave detecting device according to the application example described above, wherein the width of the pillar portion in a planar view of the substrate is from $\frac{1}{50}$ to $\frac{1}{5}$ of the length of the first metal layer and is from $\frac{1}{50}$ to $\frac{1}{5}$ of the length of the second metal layer.

According to this application example, the width of the pillar portion is from $\frac{1}{50}$ to $\frac{1}{5}$ of the length of the first metal layer and is from $\frac{1}{50}$ to $\frac{1}{5}$ of the length of the second metal layer. When the width of the pillar portion is in this range, the heat of the absorbing section is removed with high efficiency, and thus, it is possible to allow the terahertz wave to be reflected by the first metal layer and the second metal layer.

APPLICATION EXAMPLE 6

This application example is directed to the terahertz wave detecting device according to the application example described above, which further includes: a support substrate that supports the absorbing section and the converting section; and a supporting section that supports the support substrate and the substrate to be spaced from each other.

According to this application example, the supporting section supports the support substrate to be spaced from the base substrate. Thus, it is possible to decrease the rate at which the heat of the absorbing section and the converting section is conducted to the substrate. Accordingly, the temperature of the detection element can be maintained at a temperature suitable for the detection of the terahertz wave, and thus, the terahertz wave detecting device can convert the incident terahertz wave into the electric signal with high accuracy.

APPLICATION EXAMPLE 7

This application example is directed to the terahertz wave detecting device according to the application example, wherein a material of the dielectric layer is silicon dioxide, the supporting section includes a pillar arm portion that is connected to the support substrate, and one detection element is provided on the support substrate, and the length of the first metal layer and the length of the dielectric layer in an arrangement direction of the detection elements is shorter than the wavelength in vacuum of the terahertz wave absorbed by the absorbing section and is longer than 10 μm.

According to this application example, the arm portion of the supporting section is connected to the support substrate. The length of the first metal layer and the length of the dielectric layer are shorter than the wavelength of the terahertz wave in vacuum. Here, when the arrangement direction is plural, the length of the first metal layer and the length of the dielectric layer represent lengths at the shortest place. Thus, it is possible to reduce the weight of the detection element. Further, the arm portion can be narrowed. Alternatively, the arm portion can be lengthened. When the arm portion is narrow or when the arm portion is long, it is difficult to conduct the heat, and thus, the detection element can easily detect the heat. Further, the length of the detection element is longer than 10 Thus, since the terahertz wave is multiply reflected by the first metal layer and the second metal layer, the absorbing section can absorb the terahertz wave with high efficiency. As a result, the detection element can detect the terahertz wave with high sensitivity.

APPLICATION EXAMPLE 8

This application example is directed to the terahertz wave detecting device according to the application example, wherein a material of the dielectric layer is silicon dioxide, the supporting section includes a pillar arm portion that is connected to the support substrate, one detection element is provided on the support substrate, and the length of the first metal layer and the length of the dielectric layer in an arrangement direction of the detection elements is shorter than a length that is twice the length of the amplitude of the terahertz wave absorbed by the absorbing section and is longer than 10 μm.

According to this application example, the arm portion of the supporting section is connected to the support substrate. The length of the first metal layer and the length of the dielectric layer are shorter than the length that is twice the length of the amplitude of the terahertz wave. When the terahertz wave is an elliptical deflection, the amplitude of the terahertz wave represents the amplitude of an ellipse in a longitudinal axis direction. Thus, it is possible to reduce the weight of the detection element, and thus, it is possible to narrow the arm portion. Alternatively, it is possible to lengthen the arm portion. When the arm portion is narrow or when the arm portion is long, it is difficult to conduct the heat, and thus, the detection element can easily detect the heat. Further, the length of the first metal layer is longer than 10 μm. Thus, since the terahertz wave is multiply reflected by the first metal layer and the second metal layer, the absorbing section can absorb the terahertz wave with high efficiency. As a result, the detection element can detect the terahertz wave with high sensitivity.

APPLICATION EXAMPLE 9

This application example is directed to a camera including: a terahertz wave generating section that generates a terahertz wave; a terahertz wave detecting section that detects the terahertz wave that is emitted from the terahertz wave generating section and passes through or is reflected from an object; and a storage section that stores a detection result of the terahertz wave detecting section, in which the terahertz wave detecting section is any one of the above-described terahertz wave detecting devices.

According to this application example, the object is irradiated with the terahertz wave emitted from the terahertz wave generating section. The terahertz wave passes through or is reflected by the object, and then, is incident onto the terahertz wave detecting section. The terahertz wave detecting section outputs the detection result of the terahertz wave to the storage section, and the storage section stores the detection result. As the terahertz wave detecting section, the terahertz wave detecting device as described above is used. Accordingly, the camera according to this application example can be provided as an apparatus including the terahertz wave detecting device that converts the incident terahertz wave into an electric signal with high accuracy.

APPLICATION EXAMPLE 10

This application example is directed to an imaging apparatus including: a terahertz wave generating section that generates a terahertz wave; a terahertz wave detecting section that detects the terahertz wave that is emitted from the terahertz wave generating section and passes through or is reflected from an object; and an image forming section that forms an image of the object based on a detection result of the terahertz wave detecting section, in which the terahertz wave detecting section is any one of the above-described terahertz wave detecting devices.

According to this application example, the object is irradiated with the terahertz wave emitted from the terahertz wave generating section. The terahertz wave passes through or is reflected by the object, and then, is incident onto the terahertz wave detecting section. The terahertz wave detecting section outputs the detection result of the terahertz wave to the image forming section, and the image forming section forms an image of the object using the detection result. As the terahertz wave detecting section, the terahertz wave detecting device as described above is used. Accordingly, the imaging apparatus according to this application example can be provided as an apparatus including the terahertz wave detecting device that converts the incident terahertz wave into an electric signal with high accuracy.

APPLICATION EXAMPLE 11

This application example is directed to a measuring apparatus including: a terahertz wave generating section that generates a terahertz wave; a terahertz wave detecting section that detects the terahertz wave that is emitted from the terahertz wave generating section and passes through or is reflected from an object; and a measuring section that measures the object based on a detection result of the terahertz wave detecting section, in which the terahertz wave detecting section is any one of the above-described terahertz wave detecting devices.

According to this application example, the object is irradiated with the terahertz wave emitted from the terahertz wave generating section. The terahertz wave passes through or is reflected by the object, and then, is incident onto the terahertz wave detecting section. The terahertz wave detecting section outputs the detection result of the terahertz wave to the measuring section, and the measuring section measures the object using the detection result. As the terahertz wave detecting section, the terahertz wave detecting device as described above is used. Accordingly, the measuring apparatus according to this application example can be provided as an apparatus including the terahertz wave detecting device that converts the incident terahertz wave into an electric signal with high accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

In exemplary embodiments of the invention, characteristic examples of a terahertz wave detecting device will be described with reference to FIGS. 1A to 15. Hereinafter, the embodiments will be described with reference to the accompanying drawings. Here, in the respective drawings, each component is shown in a different scale so as to be a recognizable size in each drawing.

First Embodiment

Figure 1A:
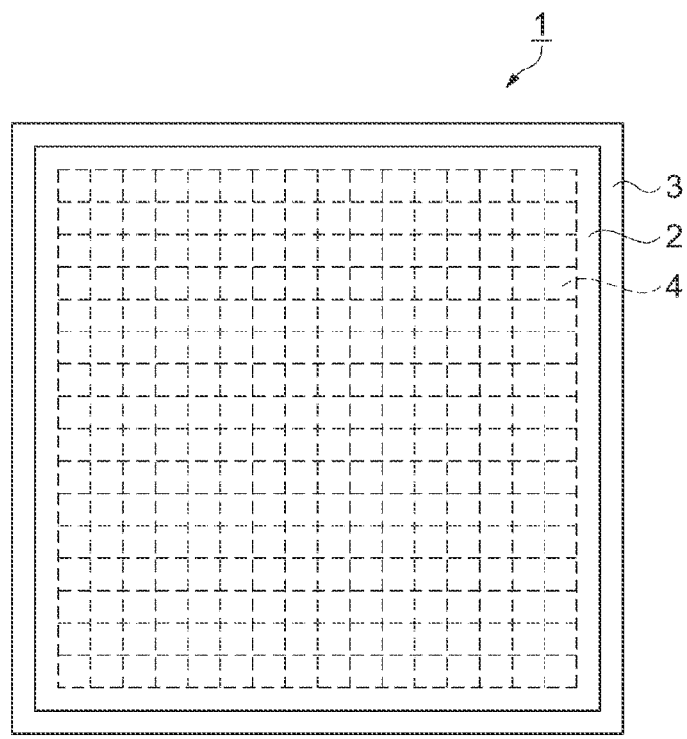
FIG. 1A is a plan view schematically illustrating a structure of a terahertz wave detecting device according to a first embodiment of the invention.

A terahertz wave detecting device according to a first embodiment will be described with reference to FIGS. 1A to 7B. FIG. 1A is a plan view schematically illustrating a structure of a terahertz wave detecting device. As shown in FIG. 1A, a terahertz wave detecting device 1 includes a base substrate 2 that is a rectangular substrate, and a frame section 3 is provided around the base substrate 2. The frame section 3 has a function of protecting the base substrate 2. Pixels 4 are arranged in a lattice form in the base substrate 2. The numbers of rows and columns of the pixels 4 are not particularly limited. As the number of pixels 4 increases, it is possible to recognize the shape of an object to be detected with high accuracy. In the present embodiment, in order to easily understand the figure, the terahertz wave detecting device 1 is set as a device that includes 16×16 pixels 4.

Figure 1B:
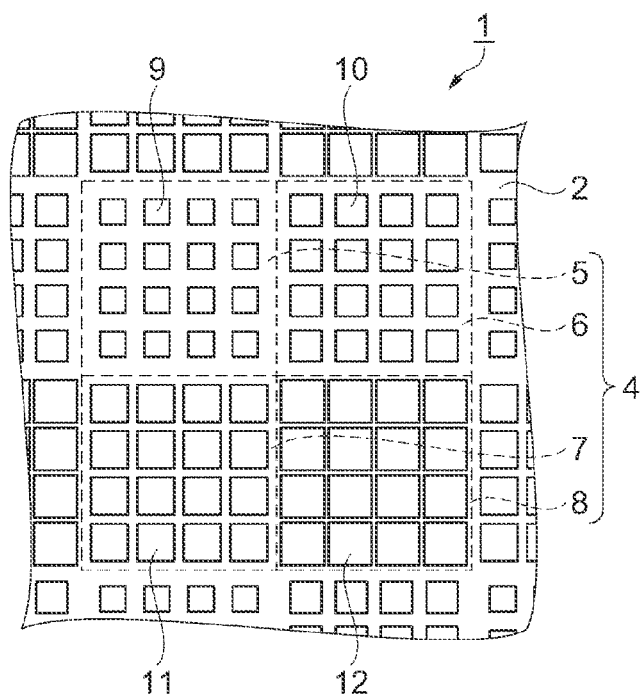
FIG. 1B is an enlarged view of a main part representing a structure of pixels according to the first embodiment of the invention.

FIG. 1B is an enlarged view of a main part representing a structure of the pixels. As shown in FIG. 1B, the pixels 4 include first pixels 5, second pixels 6, third pixels 7 and fourth pixels 8. In a planar view (seen in a plate thickness direction of the base substrate 2) of the base substrate 2, the first pixels 5 to the fourth pixels 8 are formed in a rectangular shape and have the same area. Further, the first pixels 5 to the fourth pixels 8 are arranged in four places divided by lines passing through the center of gravity of the pixels 4.

In the first pixels 5, first detection elements 9 are arranged in a 4×4 lattice form as detection elements, and in the second pixels 6, second detection elements 10 are arranged in a 4×4 lattice form as detection elements. In the third pixels 7, third detection elements 11 are arranged in a 4×4 lattice form as detection elements, and in the fourth pixels 8, fourth detection elements 12 are arranged in a 4×4 lattice form as detection elements. The first detection elements 9 to the fourth detection elements 12 have the same structure, and have different sizes in the planar view of the base substrate 2. The second detection elements 10 are larger than the first detection elements 9, and the third detection elements 11 are larger than the second detection elements 10. Further, the fourth detection elements 12 are larger than the third detection elements 11.

The first detection elements 9 to the fourth detection elements 12 have a correlation between the size in the planar view of the base substrate 2 and a resonance frequency of a terahertz wave to be detected. A large detection element can detect a terahertz wave having a long wavelength, compared with a small detection element. Wavelengths of terahertz waves detected by the first detection element 9, the second detection element 10, the third detection element 11 and the fourth detection element 12 are referred to as a first wavelength, a second wavelength, a third wavelength and a fourth wavelength, respectively. Here, the fourth wavelength is the longest wavelength among these wavelengths. The third wavelength is the second longest wavelength, and the second wavelength is the next. Further, the first wavelength is the shortest wavelength among these wavelengths.

In the pixels 4, four types of detection elements of the first detection elements 9 to the fourth detection elements 12 are arranged. Accordingly, the terahertz wave detecting device 1 can detect terahertz waves having four types of wavelengths of the first wavelength to the fourth wavelength. Since the first detection elements 9 to the fourth detection elements 12 have the same structure, the structure of the first detection elements 9 will be described, and descriptions of the second detection elements 10 to the fourth detection elements 12 will not be repeated.

Figure 2A:
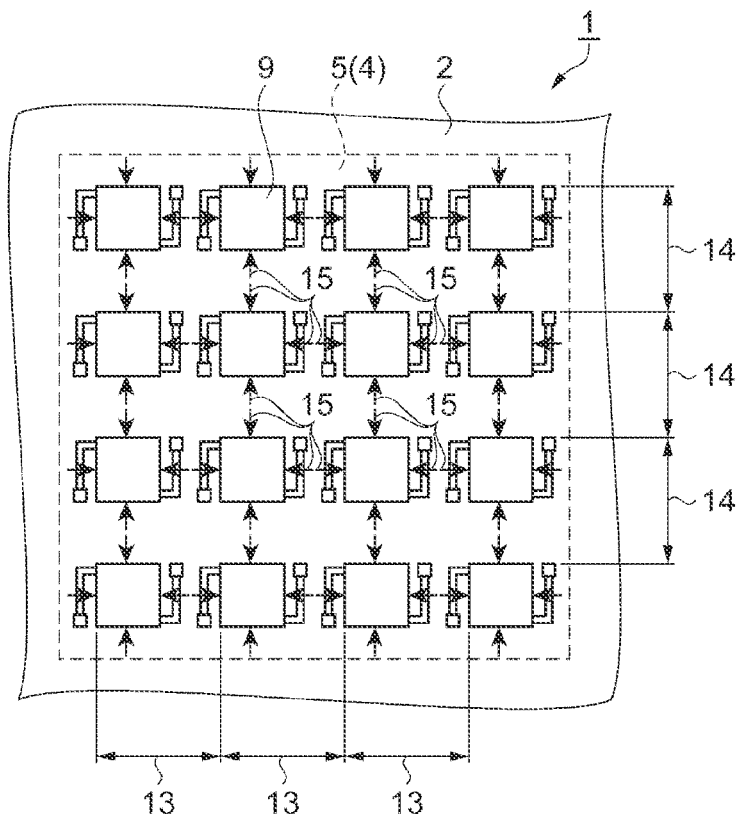
FIG. 2A is a plan view schematically illustrating an arrangement of first detection elements.
Figure 2B:
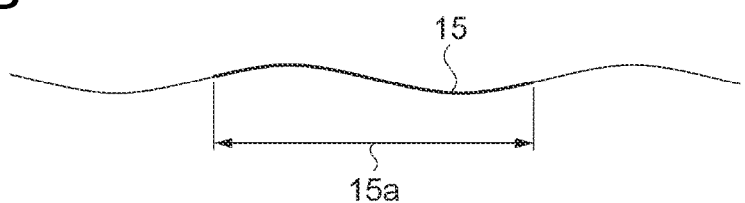
FIGS. 2B and 2C are diagrams schematically illustrating a terahertz wave.
Figure 2C:
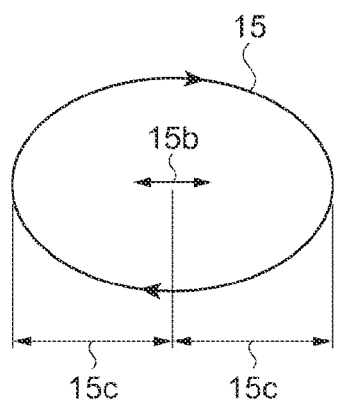

FIG. 2A is a plan view schematically illustrating an arrangement of the first detection elements. FIGS. 2B and 2C are diagrams schematically illustrating a terahertz wave. As shown in FIG. 2A, the first detection elements 9 are arranged in the 4×4 lattice form in the first pixels 5. In each row, the first detection elements 9 are arranged being spaced from each other at a uniform interval. This interval is referred to as a first interval 13 that is an interval. In each column, the first detection elements 9 are arranged being spaced from each other at a uniform interval. This interval is referred to as a second interval 14 that is another interval. If a terahertz wave 15 reaches the first detection element 9, the terahertz wave 15 is diffracted to enter the inside of the first detection element 9. A portion between the adjacent first detection elements 9 is narrow to function as a slit with respect to the terahertz wave 15. Accordingly, a traveling direction of the incident terahertz wave 15 is changed toward the inside of the first detection element 9 at an end of the first detection element 9.

As shown in FIG. 2B, the terahertz wave 15 is light that travels in vacuum with a uniform wavelength 15a. Further, the terahertz wave 15 is light detected by the first pixels 5. Here, it is preferable that the first interval 13 and the second interval 14 be shorter than the wavelength 15a. Compared with a case where the first interval 13 and the second interval 14 are longer than the wavelength 15a, in a case where the first interval 13 and the second interval 14 are shorter than the wavelength 15a, the portion between the adjacent first detection elements 9 functions as the slit with respect to the terahertz wave 15. Thus, it is possible to enhance the detection sensitivity of the first pixels 5.

As shown in FIG. 2C, the terahertz wave 15 may be deflected. The deflection is an elliptical deflection or a linear deflection. Here, a longitudinal direction of the deflection is referred as a deflection direction 15b. The deflection direction 15b is a direction that is orthogonal to the traveling direction of the terahertz wave 15. Further, a length that is a half of the length of the terahertz wave in the deflection direction 15b is referred to as an amplitude 15c. Here, it is preferable that the first interval 13 and the second interval 14 be shorter than a length that is twice the amplitude 15c. Compared with a case where the first interval 13 and the second interval 14 are longer than the length that is twice the amplitude 15c, in a case where the first interval 13 and the second interval 14 are shorter than the length that is twice the amplitude 15c, the portion between the adjacent first detection elements 9 functions as the slit with respect to the terahertz wave 15. Thus, it is possible to enhance the detection sensitivity of the first pixels 5.

Figure 3A:
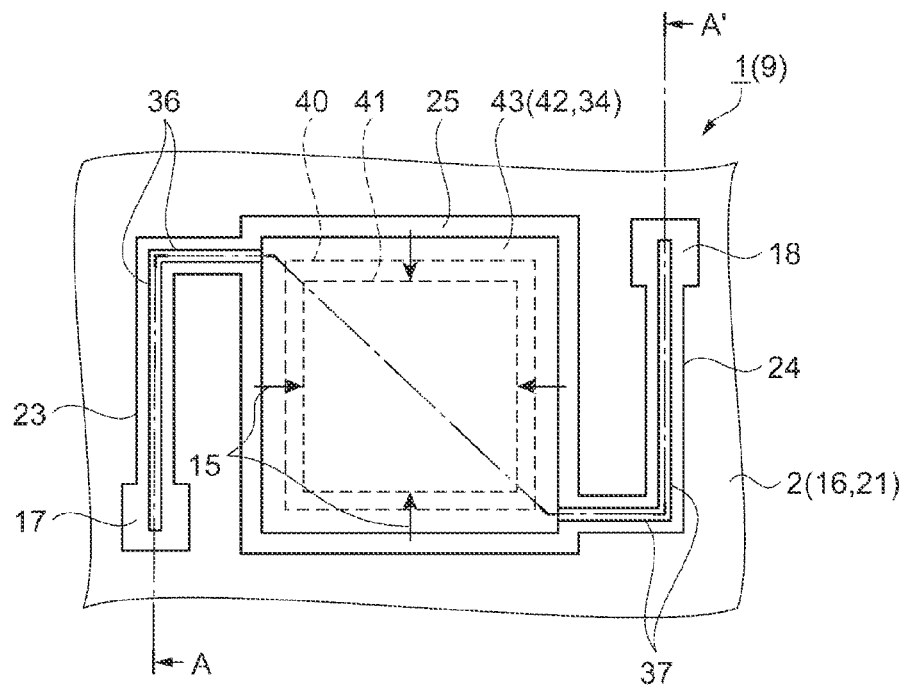
FIG. 3A is a plan view schematically illustrating a structure of the first detection element.
Figure 3B:
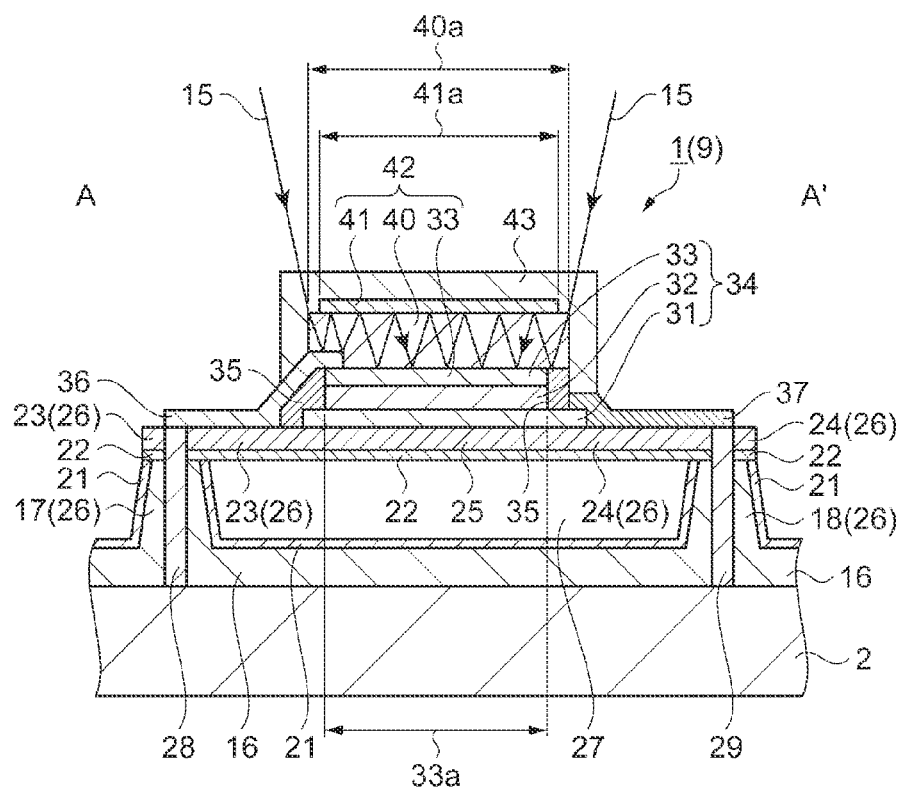
FIG. 3B is a side sectional view schematically illustrating the structure of the first detection element.

FIG. 3A is a plan view schematically illustrating a structure of the first detection element, and FIG. 3B is a side sectional view schematically illustrating the structure of the first detection element. FIG. 3B is a sectional view taken along line A-A' in FIG. 3A. As shown in FIGS. 3A and 3B, a first insulating layer 16 is provided on the base substrate 2. A material of the base substrate 2 is silicon. A material of the first insulating layer 16 is not particularly limited, and silicon nitride, nitride silicon carbide, silicon dioxide or the like can be used. In the present embodiment, for example, silicon dioxide is used. A wiring and a circuit such as a drive circuit are formed on a surface of the base substrate 2 on the side of the first insulating layer 16. The first insulating layer 16 covers the circuit on the base substrate 2 to prevent an unexpected current flow.

A first pillar portion 17 and a second pillar portion 18 are provided on the first insulating layer 16. Materials of the first pillar portion 17 and the second pillar portion 18 are the same as that of the first insulating layer 16. The shape of the first pillar portion 17 and the second pillar portion 18 is a truncated pyramid obtained by flattening a top portion of a quadrangular pyramid. On an upper side of the first insulating layer 16 and on side surfaces of the first pillar portion 17 and the second pillar portion 18, a first protecting layer 21 is provided. The first protecting layer 21 is a layer that protects the first insulating layer 16, the first pillar portion 17 and the second pillar portion 18 from an etchant used when the first pillar portion 17, the second pillar portion 18 and the like are formed. When the first pillar portion 17, the second pillar portion 18 and the first insulating layer 16 have resistance against the etchant, the first protecting layer 21 may not be provided.

On the first pillar portion 17, a first arm portion 23 that is an arm portion and a support portion is provided with a second protecting layer 22 being interposed therebetween, and on the second pillar portion 18, a second arm portion 24 that is an arm portion and a support portion with the second protecting layer 22 being interposed therebetween. Further, a support substrate 25 is disposed being in connection with the first arm portion 23 and the second arm portion 24, in which the first arm portion 23 and the second arm portion 24 support the support substrate 25. A supporting section 26 is configured by the first pillar portion 17, the second pillar portion 18, the first arm portion 23 and the second arm portion 24.

The support substrate 25 is supported by the supporting section 26 to be spaced from the base substrate 2. The second protecting layer 22 is a film that protects the first arm portion 23, the second arm portion 24 and the support substrate 25 from the etchant used when the support substrate 25, the first pillar portion 17, the second pillar portion 18 and the like are formed. Materials of the first protecting layer 21 and the second protecting layer 22 are not particularly limited. However, in the present embodiment, for example, aluminum oxide is used. When the first arm portion 23, the second arm portion 24 and the support substrate 25 have resistance against the etchant, the second protecting layer 22 may not be provided.

The support substrate 25 is spaced from the base substrate 2 by the supporting section 26, and a cavity 27 is formed between the base substrate 2 and the support substrate 25. The shape of the first arm portion 23 and the second arm portion 24 is a shape in which a rectangular pillar is bent at a right angle. Thus, the first arm portion 23 and the second arm portion 24 are elongated, to thereby suppress heat conduction from the support substrate 25 to the base substrate 2.

A first through electrode 28 that passes through the first pillar portion 17 and the first arm portion 23 is provided between the front surface of the base substrate 2 and the front surface of the first arm portion 23. Further, a second through electrode 29 that passes through the second pillar portion 18 and the second arm portion 24 is provided between the front surface of the base substrate 2 and the front surface of the second arm portion 24.

A material of the support substrate 25 is not particularly limited as long as it has stiffness and can be machined. In the present embodiment, for example, a three-layer structure of silicon dioxide, silicon nitride and silicon dioxide is used. Materials of the first through electrode 28 and the second through electrode 29 are not particularly limited as long as they are conductive and can form fine patterns, and for example, metal such as titanium, tungsten or aluminum can be used.

A converting section 34 in which a third metal layer 31, a pyroelectric layer 32 and a second metal layer 33 are layered is provided on the support substrate 25. In other words, the support substrate 25 supports the converting section 34 and an absorbing section 42. The converting section 34 has a function of a pyroelectric sensor that converts heat into an electric signal. A material of the third metal layer 31 may be a metal having high conductivity, and preferably, a metal further having heat resistance. In the present embodiment, for example, the third metal layer 31 is obtained by sequentially layering an iridium layer, an iridium oxide layer and a platinum layer from the side of the support substrate 25. The iridium layer has an alignment control function, the iridium oxide layer has a reducing gas barrier function, and the platinum layer has a seed layer function.

A material of the pyroelectric layer 32 is a dielectric capable of achieving a pyroelectric effect, which can generate change in an electricity polarization quantity in accordance with a temperature change. As the material of the pyroelectric layer 32, lead zirconate titanate (PZT) or PZTN in which Nb (niobium) is added to PZT may be used.

A material of the second metal layer 33 may be a metal having high conductivity, and preferably, a metal further having heat resistance. In the present embodiment, for example, on the material of the second metal layer 33, a platinum layer, an iridium oxide layer and an iridium layer are sequentially layered from the side of the pyroelectric layer 32. The platinum layer has an alignment matching function, the iridium oxide layer has a reducing gas barrier function, and the iridium layer has a low resistance layer function. The materials of the second metal layer 33 and the third metal layer 31 are not limited to the above examples, and for example, a metal such as gold, copper, iron, aluminum, zinc, chrome, lead or titanium or an alloy such as nichrome may be used.

A second insulating layer 35 is disposed around the converting section 34. Further, a first wiring 36 that is a wiring that connects the first through electrode 28 and the second metal layer 33 is provided on the first arm portion 23, and a second wiring 37 that is a wiring that connects the second through electrode 29 and the third metal layer 31 is provided on the second arm portion 24. An electric signal output by the converting section 34 is transmitted to the electric circuit on the base substrate 2 through the first wiring 36, the first through electrode 28, the second wiring 37 and the second through electrode 29. The first wiring 36 is connected to the second metal layer 33 from the first arm portion 23 through above the second insulating layer 35. Thus, the first wiring 36 is prevented from being in contact with the third metal layer 31 and the pyroelectric layer 32. Further, an insulating film (not shown) may be provided to cover the first wiring 36 and the second wiring 37. Thus, an unexpected current is prevented from flowing in the first wiring 36 and the second wiring 37.

The absorbing section 42 on which the second metal layer 33, a dielectric layer 40 and a first metal layer 41 are layered is provided on the pyroelectric layer 32. The second metal layer 33 of the absorbing section 42 and the second metal layer 33 of the converting section 34 are formed by a common metal layer. That is, the second metal layer 33 is a metal layer in which electric current flows according to the pyroelectric effect of the pyroelectric layer 32. Further, the second metal layer 33 functions as a part of the absorbing section 42. Thus, it is possible to reduce the number of members that form the terahertz wave detecting device 1, to thereby reduce the cost. Although not shown, the second metal layer 33 may not be the common metal layer in the absorbing section 42 and the converting section 34. That is, the absorbing section 42 and the converting section 34 may have different metal layers.

The dielectric layer 40 is provided on the second metal layer 33. The thickness of the dielectric layer 40 is 10 nm to 10 µm for example. The dielectric constant of the dielectric layer 40 is 2 to 100, for example. The dielectric layer 40 can be formed of zirconium oxide, barium titanate, hafnium oxide, hafnium silicate, titanium oxide, polyimide, silicon nitride or aluminum oxide, or may use a layered body thereof. A material of the first metal layer 41 may be a material that easily reflects the terahertz wave 15, and for example, a metal such as gold, copper, iron, aluminum, zinc, chrome, lead or titanium or an alloy such as nichrome may be used.

When the first detection element 9 is irradiated with the terahertz wave 15, the terahertz wave 15 is diffracted at an end surface of the first detection element 9. Thus, the traveling direction of the terahertz wave 15 is changed, so that a part of the terahertz wave 15 enters the inside of the dielectric layer 40. The first detection elements 9 are arranged on the base substrate 2 in the lattice form, and the intervals of the first metal layers 41 are the same as the first interval 13 and the second interval 14. Further, the first metal layers 41 are arranged with smaller intervals compared with the wavelength of the terahertz wave 15. Thus, the portion between the adjacent first detection elements 9 functions as the slit with respect to the terahertz wave 15. Accordingly, the traveling direction of the incident terahertz wave 15 is changed toward the inside of the first detection element 9 at the end of the first detection element 9. Further, the terahertz wave 15 travels inside the dielectric layer 40 while being multiply reflected between the first metal layer 41 and the second metal layer 33.

Energy of the terahertz wave 15 that travels inside the dielectric layer 40 is converted into heat. Further, as the light intensity of the terahertz wave 15 that is incident onto the first detection element 9 is strong, the dielectric layer 40 is greatly heated, and thus, the temperature of the absorbing section 42 increases. The heat of the absorbing section 42 is conducted to the converting section 34. Thus, the temperature of the converting section 34 increases. Then, the converting section 34 converts the increased temperature into an electric signal and outputs the result to the first through electrode 28 and the second through electrode 29.

The heat accumulated in the absorbing section 42 and the converting section 34 is conducted to the base substrate 2 through the second metal layer 33, the first wiring 36, the first arm portion 23 and the first pillar portion 17. Further, the heat accumulated in the absorbing section 42 and the converting section 34 is conducted to the base substrate 2 through the third metal layer 31, the second wiring 37, the second arm portion 24 and the second pillar portion 18. Accordingly, when the light intensity of the terahertz wave 15 that is incident onto the first detection element 9 decreases, the temperature of the absorbing section 42 and the converting section 34 decreases with the lapse of time. Accordingly, the first detection element 9 can detect variation of the light intensity of the terahertz wave 15 that is incident onto the first detection element 9.

The second metal layer 33 is a square in a planar view, and has a side length of a second metal layer length 33a. The first metal layer 41 is also a square in a planar view, and has a side length of a first metal layer length 41a. The dielectric layer 40 is also a square in a planar view, and has a side length of a dielectric layer length 40a. It is preferable that the second metal layer length 33a, the dielectric layer length 40a and the first metal layer length 41a be shorter than the wavelength 15a of the terahertz wave 15, respectively. Further, it is preferable that the second metal layer length 33a, the dielectric layer length 40a and the first metal layer length 41a be shorter than twice the amplitude 15c. By shortening the second metal layer length 33a, the dielectric layer length 40a and the first metal layer length 41a, it is possible to reduce the weight of the absorbing section 42. Thus, it is possible to narrow the first arm portion 23 and the second arm portion 24, and it is thus possible to increase thermal insulation of the first arm portion 23 and the second arm portion 24. As a result, dissipation of the heat from the converting section 34 and the absorbing section 42 becomes difficult, and thus, it is possible to improve the detection accuracy of the terahertz wave 15.

When the material of the dielectric layer 40 is silicon dioxide, it is preferable that the first metal layer length 41a, the dielectric layer length 40a and the second metal layer length 33a be longer than 10 µm, respectively. Here, it is possible to absorb the terahertz wave 15 by the absorbing section 42 with high efficiency.

A third protecting layer 43 is provided to cover the converting section 34 and the absorbing section 42. The third protecting layer 43 prevents dust from adhering to the converting section 34 and the absorbing section 42. Further, the third protecting layer 43 suppresses the converting section 34 and the absorbing section 42 from deteriorating by intrusion of oxygen or moisture. As a material of the third protecting layer 43, various resin materials may be used. The third protecting layer 43 may further cover the first arm portion 23 and the second arm portion 24. Thus, the third protecting layer 43 can suppress dust from adhering to the first wiring 36 and the second wiring 37, or can suppress unexpected static electricity from flowing therein.

The positions of the first metal layers 41 have the same appearance as the arrangement of the respective first detection elements 9. Accordingly, the first interval 13 that is the interval of the respective first detection elements 9 has the same length as the interval of the first metal layers 41, which is the same length as the intervals of the dielectric layers 40 and the second metal layers 33. Further, by setting the interval of the first metal layers 41 to be shorter than the wavelength 15a, it is possible to diffract the terahertz wave 15 with high efficiency to allow the terahertz wave 15 to travel toward the inside of the dielectric layer 40.

Figure 4A:
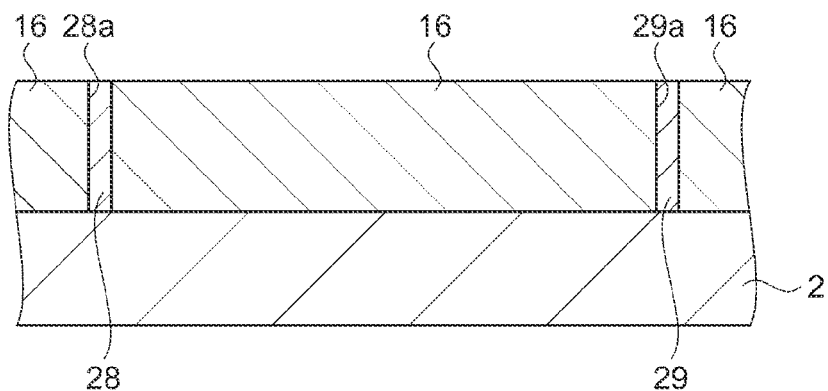
FIGS. 4A to 4C are diagrams schematically illustrating a manufacturing method of the first detection element.

Next, a manufacturing method of the first detection element 9 will be described with reference to FIGS. 4A to 7B. Since a manufacturing method of the second detection element 10 to the fourth detection element 12 is the same as the manufacturing method of the first detection element 9, description thereof will not be repeated. FIGS. 4A to 7B are diagrams schematically illustrating the manufacturing method of the first detection element 9. As shown in FIG. 4A, the first insulating layer 16 is formed on the base substrate 2. The first insulating layer 16 is formed by a chemical vapor deposition (CVD) method, for example. Then, a first through hole 28a and a second through hole 29a are patterned and formed on the first insulating layer 16 by a photolithography method and an etching method. Hereinafter, it is assumed that the patterning is performed by the photolithography method and the etching method. Then, the first through electrode 28 and the second through electrode 29 are formed in the first through hole 28a and the second through hole 29a, respectively. The first through electrode 28 and the second through electrode 29 are formed by a plating method or a sputtering method, for example.

Figure 4B:
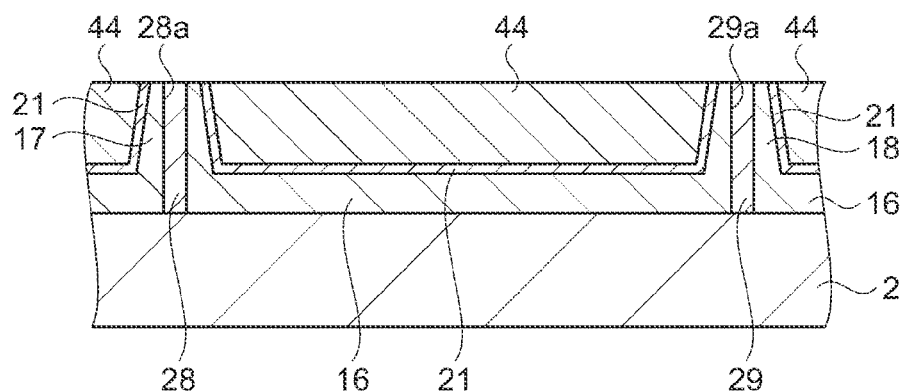

As shown in FIG. 4B, the first insulating layer 16 is patterned to form the first pillar portion 17 and the second pillar portion 18. The first pillar portion 17 and the second pillar portion 18 can be formed so that side surfaces thereof are inclined using a dry etching method by adjusting manufacturing conditions. Then, the first protecting layer 21 is formed on the first insulating layer 16, the first pillar portion 17 and the second pillar portion 18. Here, an aluminum oxide film is formed by the CVD method. Thus, the first insulating layer 16, the first pillar portion 17 and the second pillar portion 18 are in a state of being covered by the aluminum oxide film.

Then, a sacrificial layer 44 formed of SiO2 is formed on the first protecting layer 21 by a CVD method. Here, an SiO2 film is formed at a height that exceeds the first pillar portion 17 and the second pillar portion 18, and the film thickness of the sacrificial layer 44 is set to be thicker than the height of the first pillar portion 17 and the second pillar portion 18. Then, an upper surface of the sacrificial layer 44 is flattened by a chemical mechanical polishing (CMP) method, so that the upper surfaces of the first pillar portion 17 and the second pillar portion 18 and the surface of the sacrificial layer 44 have the same surface. Further, the first protecting layer 21 and the sacrificial layer 44 that remain on the upper surfaces of the first pillar portion 17 and the second pillar portion 18 are removed.

Figure 4C:
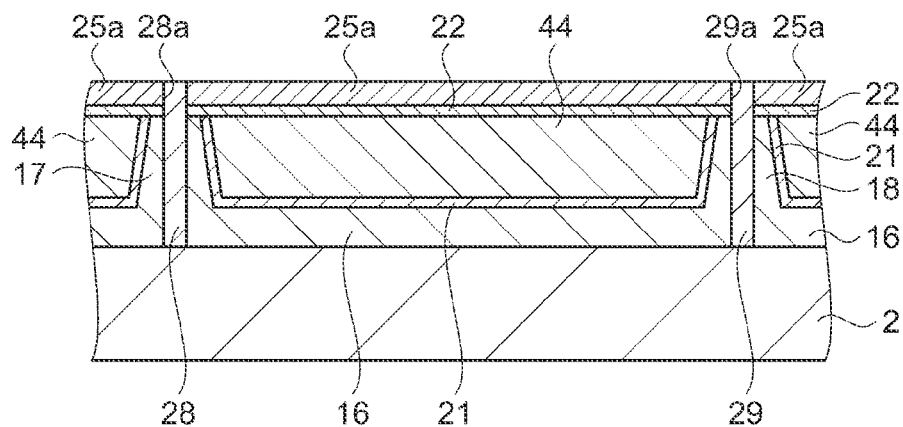

As shown in FIG. 4C, the second protecting layer 22 is formed on the sacrificial layer 44. The second protecting layer 22 is formed by a CVD method or a sputtering method. Then, a support substrate layer 25*a* is formed on the second protecting layer 22. The support substrate layer 25*a* is a layer that serves as a source of the first arm portion 23, the second arm portion 24 and the support substrate 25. The support substrate layer 25*a* is formed by a CVD method or a sputtering method, for example.

Then, the second protecting layer 22 and the support substrate layer 25*a* are patterned to form the first through hole 28*a* and the second through hole 29*a*. The first through hole 28*a* and the second through hole 29*a* are formed so that the first through electrode 28 and the second through electrode 29 respectively formed in the previous processes are exposed. Then, the material of the first through electrode 28 is filled in the first through hole 28*a*, and the material of the second through electrode 29 is filled in the second through hole 29*a*. The first through electrode 28 and the second through electrode 29 are formed by a plating method or a sputtering method, for example. Through the above processes, the first through electrode 28 and the second through electrode 29 that are extended from the front surface of the support substrate layer 25*a* to the base substrate 2 are formed.

Figure 5A:
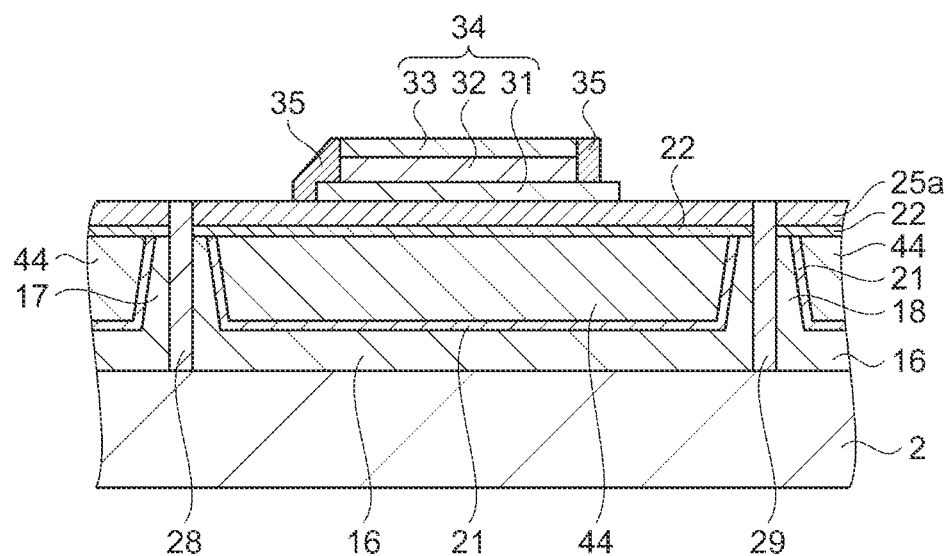
FIGS. 5A and 5B are diagrams schematically illustrating a manufacturing method of the first detection element.

As shown in FIG. 5A, the third metal layer 31, the pyroelectric layer 32 and the second metal layer 33 are sequentially layered on the support substrate layer 25*a*. Thus, the converting section 34 is formed. The third metal layer 31 and the second metal layer 33 are formed by a sputtering method, for example, and by being patterned. The pyroelectric layer 32 is formed by a sputtering method or a sol-gel method, and then, by being patterned. Then, the second insulating layer 35 is formed on the third metal layer 31 and the support substrate layer 25*a*. The second insulating layer 35 is formed by a sputtering method or a CVD method and by being patterned.

Figure 5B:
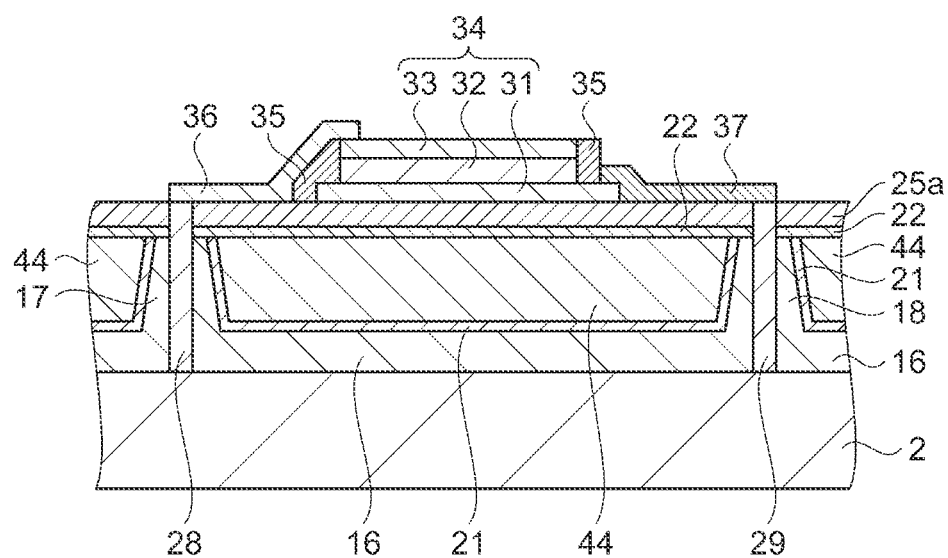

As shown in FIG. 5B, the second wiring 37 is formed on the support substrate layer 25*a* to electrically connect the third metal layer 31 and the second through electrode 29. Further, the first wiring 36 is formed on the support substrate layer 25*a* and on the second insulating layer 35 to electrically connect the second metal layer 33 and the first through electrode 28. The first wiring 36 and the second wiring 37 are formed by a plating method or a sputtering method, for example.

Figure 6A:
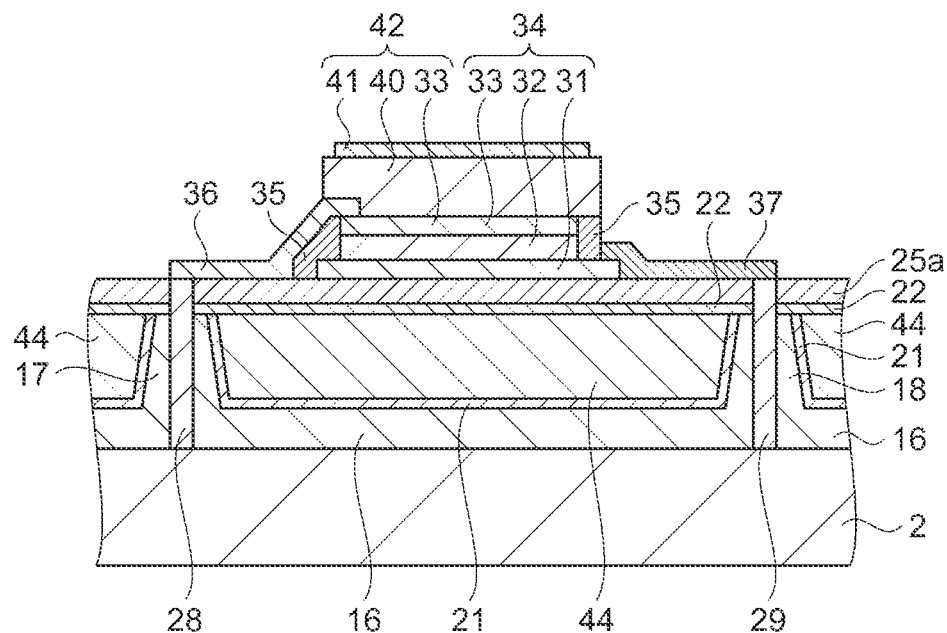
FIGS. 6A and 6B are diagrams schematically illustrating a manufacturing method of the first detection element.

As shown in FIG. 6A, the dielectric layer 40 and the first metal layer 41 are sequentially layered on the second metal layer 33. Thus, the absorbing section 42 can be formed. The dielectric layer 40 is formed by a CVD method, for example, and by being patterned. The first metal layer 41 is formed by a sputtering method, for example, and by being patterned.

Figure 6B:
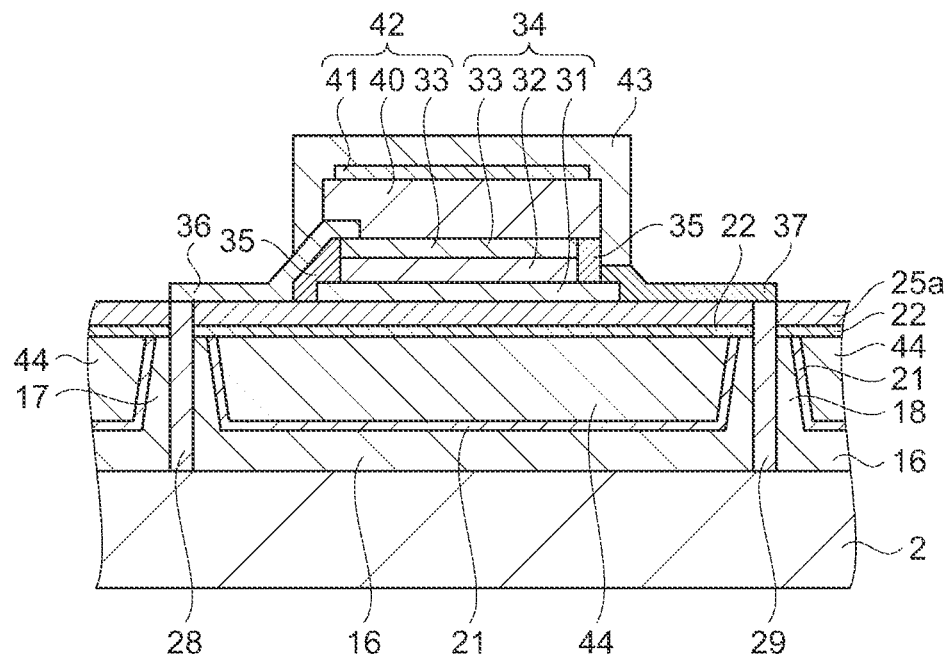

As shown in FIG. 6B, the third protecting layer 43 is formed to cover the converting section 34 and the absorbing section 42. The third protecting layer 43 is formed by a CVD method, for example, and by being patterned. The third protecting layer 43 may be further formed to cover the first wiring 36 and the second wiring 37.

Figure 7A:
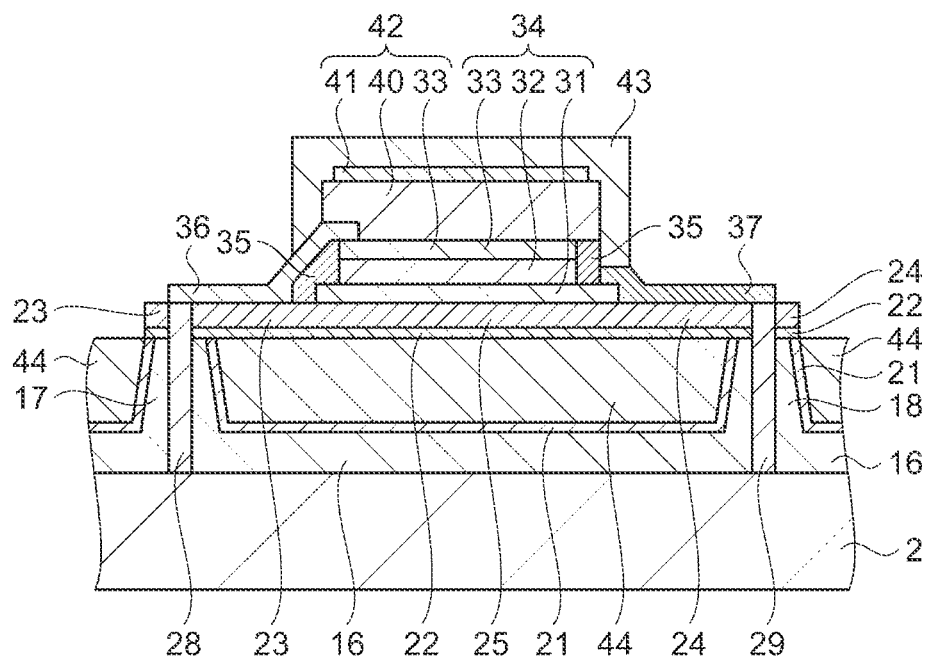
FIGS. 7A and 7B are diagrams schematically illustrating a manufacturing method of the first detection element.

As shown in FIG. 7A, the support substrate layer 25*a* and the second protecting layer 22 are patterned. Thus, the support substrate 25, the first arm portion 23 and the second arm portion 24 are formed.

Figure 7B:
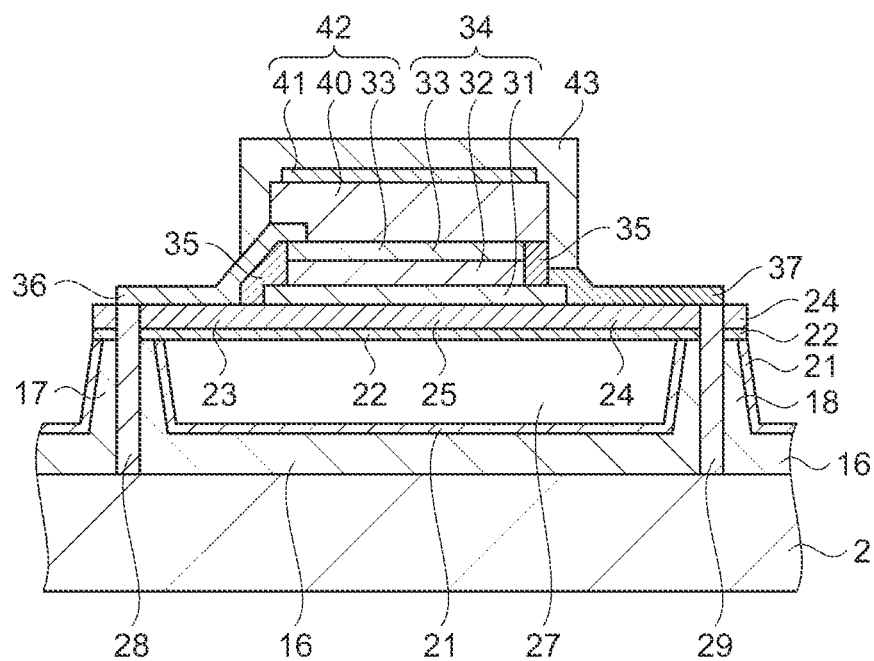

As shown in FIG. 7B, the sacrificial layer 44 is removed. The removal of the sacrificial layer 44 is performed by masking and then etching. After etching, the mask is removed and washed. Since the first pillar portion 17 and the second pillar portion 18 are protected by the first protecting layer 21, the first pillar portion 17 and the second pillar portion 18 are formed without being etched. Since the surface of the support substrate 25 on the side of the base substrate 2 is also protected by the second protecting layer 22, the support substrate 25 is formed without being etched. Thus, the first pillar portion 17, the second pillar portion 18 and the cavity 27 are formed. Further, the frame section 3 may be formed together with the first pillar portion 17 and the second pillar portion 18. The second detection elements 10 to the fourth detection elements 12 are formed in parallel with the first detection elements 9. Through the above processes, the terahertz wave detecting device 1 is completed.

As described above, according to the present embodiment, the following effects are obtained.

(1) According to the present embodiment, the absorbing section 42 has the structure in which the dielectric layer 40 is interposed between the first metal layer 41 and the second metal layer 33. When the terahertz wave 15 is incident on the dielectric layer 40, the terahertz wave 15 travels inside the dielectric layer 40. The terahertz wave 15 is reflected on a contact surface of the first metal layer 41 and the dielectric layer 40, and is reflected on a contact surface of the second metal layer 33 and the dielectric layer 40. Further, when the terahertz wave 15 travels inside the dielectric layer 40 while repeating the reflection, energy is absorbed in the dielectric layer 40 and is converted into heat. Accordingly, the terahertz wave 15 that is incident on the terahertz wave detecting device 1 is absorbed in the absorbing section 42 with high efficiency, so that the energy is converted into the heat.

Since the first detection elements 9 are arranged, the first metal layers 41 and the second metal layers 33 are also arranged. Further, a portion between the adjacent first metal layers 41 and a portion between the adjacent second metal layers 33 function as a slit with respect to the terahertz wave 15. Accordingly, the terahertz wave 15 is incident on the absorbing section 42 with high accuracy, and thus, the terahertz wave detecting device 1 can convert the incident terahertz wave 15 into the electric signal with high efficiency.

(2) According to the present embodiment, the first metal layers 41 are arranged with the interval smaller than the wavelength of the terahertz wave 15 in vacuum. Further, the second metal layer 33 is disposed at the position that faces the first metal layer. Here, since the interval between the adjacent first metal layers is narrow, the terahertz wave is easily diffracted. Similarly, since the interval between the adjacent second metal layers 33 is narrow, the terahertz wave 15 is easily diffracted. Accordingly, the terahertz wave 15 can easily enter the inside of the absorbing section 42.

(3) According to the present embodiment, the second metal layer 33 is connected to the first wiring 36 that transmits the electric signal. Accordingly, the heat generated in the absorbing section 42 is conducted to the second metal layer 33 and the first wiring 36 to be removed from the absorbing section 42. Accordingly, the heat is suppressed from remaining in the absorbing section 42, and thus, the terahertz wave detecting device 1 can convert the incident terahertz wave 15 into the electric signal with high responsiveness.

(4) According to the present embodiment, the first detection element 9 includes the supporting section 26, and the supporting section 26 supports the support substrate 25 in midair. Thus, it is possible to decrease a dissipation rate of the heat of the first detection element 9. Accordingly, the temperature of the first detection element 9 can be maintained at a temperature suitable for the detection of the terahertz wave 15, and thus, the terahertz wave detecting device 1 can convert the incident terahertz wave 15 into the electric signal with high accuracy.

(5) According to the present embodiment, the first arm portion 23 and the second arm portion 24 are connected to the support substrate 25. The length of the first metal layer 41 is shorter than the wavelength of the terahertz wave in vacuum. Thus, it is possible to reduce the weight of the first detection element 9. Further, it is possible to narrow the first arm portion 23 and the second arm portion 24. Alternatively, it is possible to lengthen the first arm portion 23 and the second arm portion 24. When the first arm portion 23 and the second arm portion 24 are narrow, or when the first arm portion 23 and the second arm portion 24 are long, since it is difficult to conduct the heat, the first detection element 9 can easily detect the heat. Further, since the length of the first metal layer 41 is longer than 10 µm, it is possible to reliably reflect the terahertz wave 15. Accordingly, the absorbing section 42 can absorb the terahertz wave 15 with high efficiency, and thus, the first detection elements 9 can detect the terahertz wave 15 with high sensitivity.

(6) According to the present embodiment, the first arm portion 23 and the second arm portion 24 are connected to the support substrate 25. The length of the first metal layer 41 is shorter than the length that is twice the amplitude of the terahertz wave 15. Thus, it is possible to reduce the weight of the first detection elements 9. Further, it is possible to narrow the first arm portion 23 and the second arm portion 24. Alternatively, it is possible to lengthen the first arm portion 23 and the second arm portion 24. When the first arm portion 23 and the second arm portion 24 are narrow, or when the first arm portion 23 and the second arm portion 24 are long, since it is difficult to conduct the heat, the first detection elements 9 can easily detect the heat. Further, since the length of the first metal layer 41 is longer than the first detection elements 9 can reliably reflect the terahertz wave 15. Accordingly, the absorbing section 42 can absorb the terahertz wave 15 with high efficiency, and thus, the first detection elements 9 can detect the terahertz wave 15 with high sensitivity.

(7) According to the present embodiment, the terahertz wave 15 is reflected between the first metal layer and the second metal layer 33 and travels inside the dielectric layer 40. Accordingly, the dielectric layer 40 may be shorter than the wavelength, and thus, it is possible to reduce the length of the absorbing section 42. As a result, it is possible to reduce the thermal capacity of the absorbing section 42, and thus, the first detection elements 9 can detect the terahertz wave 15 with high sensitivity.

Second Embodiment

Figure 8A:
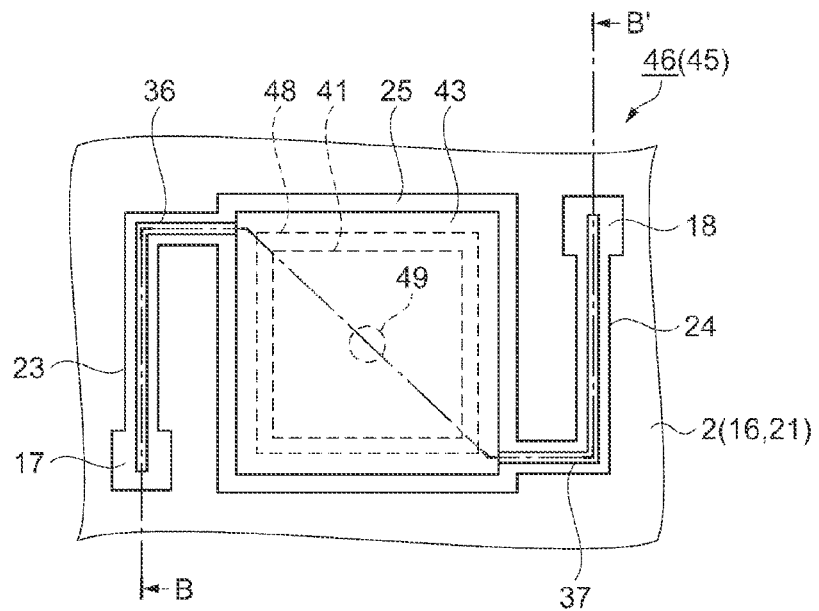
FIG. 8A is a plan view schematically illustrating a structure of a first detection element according to a second embodiment of the invention.
Figure 8B:
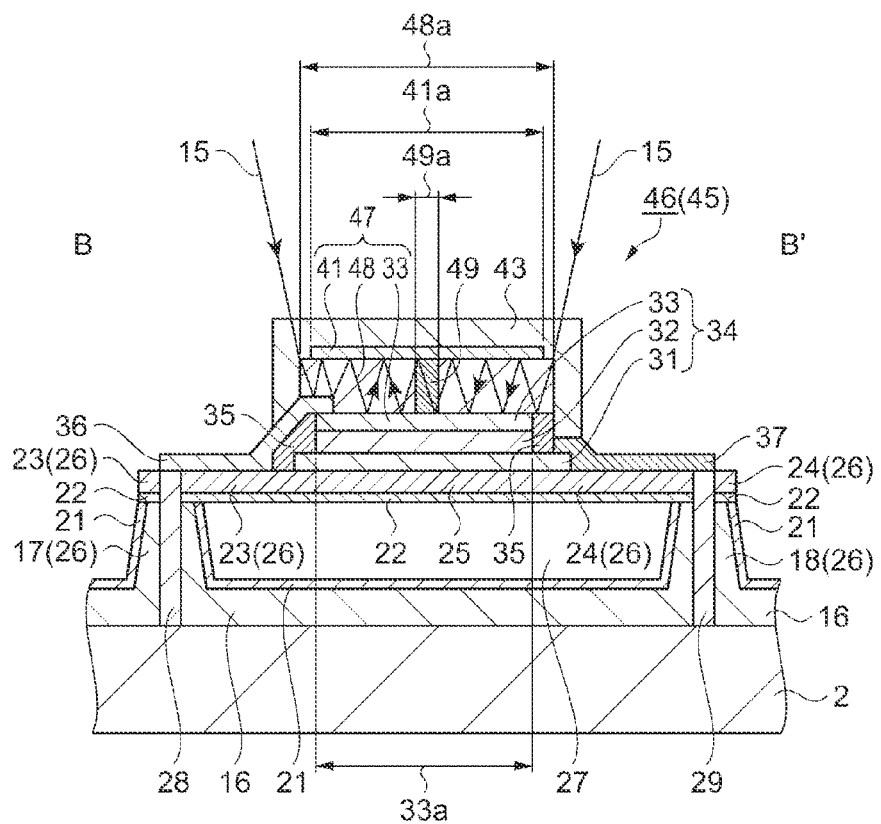
FIG. 8B is a side sectional view schematically illustrating the structure of the first detection element according to the second embodiment of the invention.

Next, an embodiment of a terahertz wave detecting device will be described with reference to FIGS. 8A and 8B. FIG. 8A is a plan view schematically illustrating a structure of a first detection element, and FIG. 8B is a side sectional view schematically illustrating the structure of the first detection element. FIG. 8B is a sectional view taken along line B-B' in FIG. 8A. The present embodiment is different from the first embodiment in that a metal pillar is provided between the first metal layer 41 and the second metal layer 33. With respect to the same configurations as in the first embodiment, description thereof will not be repeated.

That is, in the present embodiment, as shown in FIGS. 8A and 8B, in a first detection element 46 of a terahertz wave detecting device 45, an absorbing section 47 is provided to overlap a converting section 34. In the absorbing section 47, a dielectric layer 48 and a first metal layer 41 are layered on a second metal layer 33. The dielectric layer 48 is formed of the same material and has the same appearance shape as in the dielectric layer 40 of the first embodiment. Further, a metal pillar 49 that is a pillar portion is provided at the center of the dielectric layer 48 in a planar view of the base substrate 2. A material of the metal pillar 49 is the same metallic material as those of the second metal layer 33 and the first metal layer 41. Further, the metal pillar 49 connects the second metal layer 33 and the first metal layer 41. Thus, heat of the first metal layer 41 is conducted to the second metal layer 33 through the metal pillar 49. Further, the heat of the first metal layer 41 is conducted to the metal pillar 49, the second metal layer 33 and the first wiring 36 to be removed from the absorbing section 47. Accordingly, the heat is suppressed from remaining in the absorbing section 47, and thus, the terahertz wave detecting device 45 can convert the incident terahertz wave 15 into an electric signal with high responsiveness.

The width of the metal pillar 49 is referred to as a metal pillar width 49a. The metal pillar width 49a is from ¹⁄₅₀ to ⅕ of the first metal layer length 41a. Further, the metal pillar width 49a is from ¹⁄₅₀ to ⅕ of the second metal layer length 33a. Further, when the length of the dielectric layer 48 is referred to as a dielectric layer length 48a, the metal pillar width 49a is from ¹⁄₅₀ to ⅕ of the dielectric layer length 48a. When the metal pillar width 49a is in this range, the heat of the absorbing section 47 is removed, and thus, it is possible to allow the terahertz wave 15 to be reflected by the first metal layer 41 and the second metal layer 33. When the first metal layer 41 is a rectangular shape, the first metal layer length 41a is a long side length, and when the second metal layer 33 is a rectangular shape, the second metal layer length 33a is a long side length. When the dielectric layer 48 is a rectangular shape, the dielectric layer length 48a is a long side length.

As described above, according to the present embodiment, the following effects are obtained.

(1) According to the present embodiment, since the heat is suppressed from remaining in the absorbing section 47, the terahertz wave detecting device 45 can convert the incident terahertz wave 15 into the electric signal with high responsiveness.

(2) According to the present embodiment, since the heat of the absorbing section 47 is removed, it is possible to allow the terahertz wave 15 to be reflected by the first metal layer 41 and the second metal layer 33.

Third Embodiment

Figure 9:
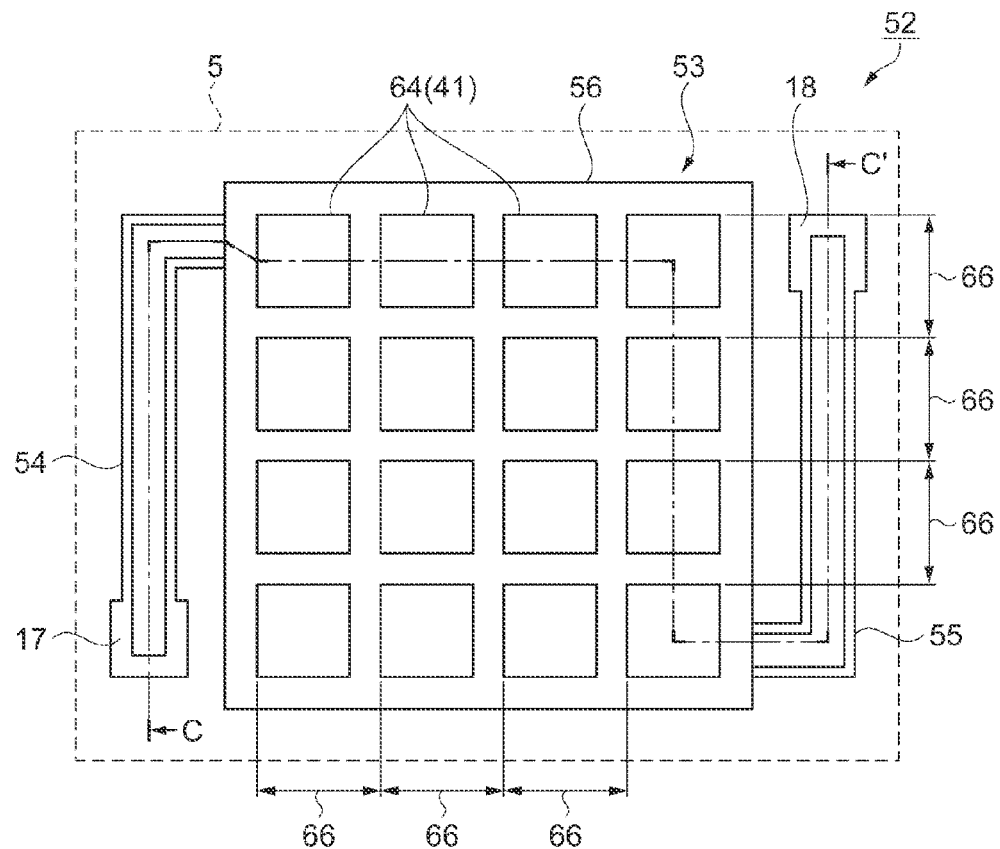
FIG. 9 is a plan view schematically illustrating a structure of a first detection element according to a third embodiment of the invention.
Figure 10:
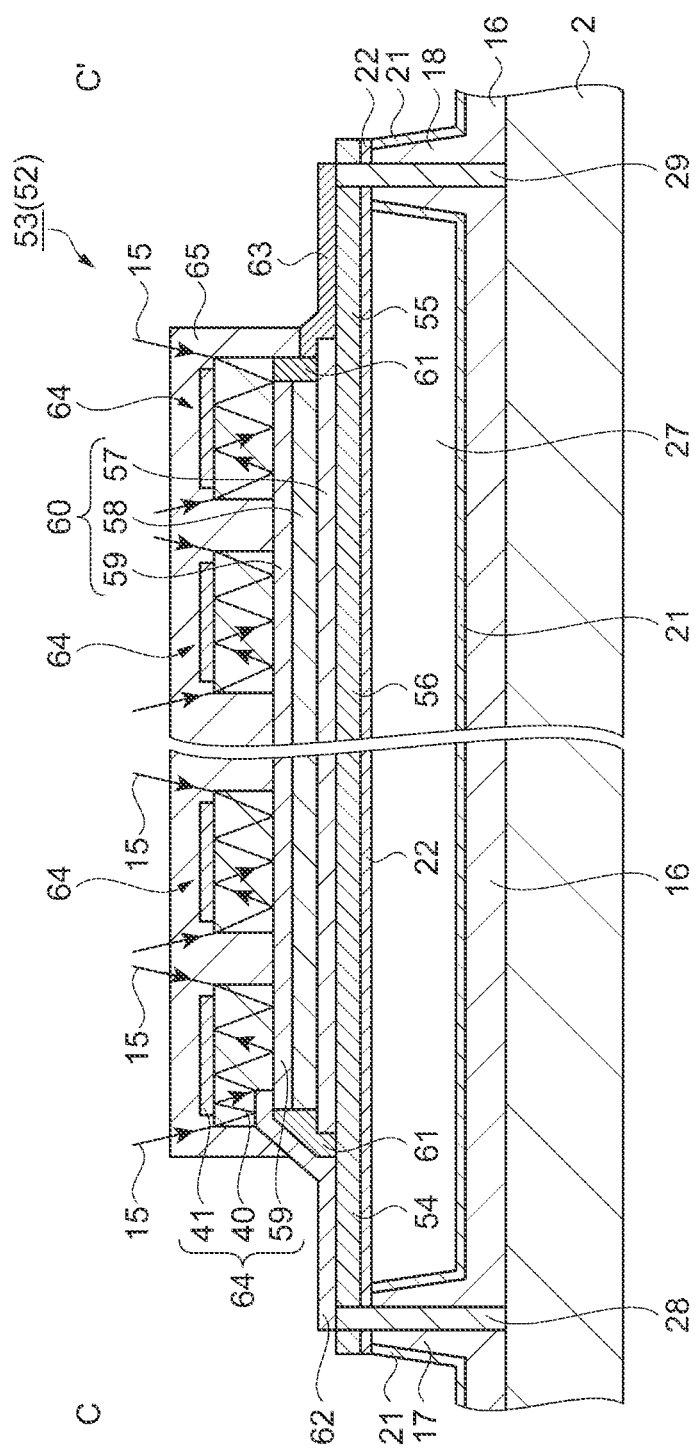
FIG. 10 is a side sectional view schematically illustrating the structure of the first detection element.

Next, an embodiment of the terahertz wave detecting device will be described with reference to FIGS. 9 and 10. FIG. 9 is a plan view schematically illustrating a structure of a first detection element, and FIG. 10 is a side sectional view schematically illustrating the structure of the first detection element. FIG. 10 is a sectional view taken along line C-C' in FIG. 9. The present embodiment is different from the first embodiment in that absorbing sections are arranged on a converting section in a lattice form. With respect to the same configurations as in the first embodiment, description thereof will not be repeated.

That is, in the present embodiment, as shown in FIGS. 9 and 10, a terahertz wave detecting device 52 is provided with a first detection element 53 in a first pixel 5. The first detection element 53 includes a base substrate 2, and a first pillar portion 17 and a second pillar portion 18 which are provided on the base substrate 2. A first arm portion 54 is provided on the first pillar portion 17 and a second arm portion 55 is provided on the second pillar portion 18. The first arm portion 54 and the second arm portion 55 support a support substrate 56. A cavity 27 is formed between the support substrate 56 and the base substrate 2.

A converting section 60 in which a third metal layer 57, a pyroelectric layer 58 and a second metal layer 59 are layered is provided on the support substrate 56. A second insulating layer 61 is provided around the converting section 60. A first through electrode 28 is provided at the center of the first pillar portion 17, and a second through electrode 29 is provided at the center of the second pillar portion 18. The second metal layer 59 and the first through electrode 28 are connected to each other by a first wiring 62, and the third metal layer 57 and the second through electrode 29 are connected to each other by a second wiring 63.

Dielectric layers 40 are arranged on the second metal layer 59 in a lattice form, and a first metal layer 41 is provided on each dielectric layer 40. An absorbing section 64 is configured by the second metal layer 59, the dielectric layer 40 and the first metal layer 41. A third protecting layer 65 is provided to cover the respective absorbing sections 64. In FIG. 9, the third protecting layer 65 is not shown.

The terahertz wave 15 that is incident onto the first detection element 53 is diffracted between adjacent absorbing sections 64 to enter (be incident onto) the dielectric layer 40. In the dielectric layer 40, the terahertz wave 15 is reflected on an interface between the dielectric layer 40 and the first metal layer 41, and is reflected at an interface between the dielectric layer 40 and the second metal layer 59. Further, the terahertz wave 15 travels passing through the arranged absorbing sections 64 while being reflected. In the traveling process, energy of the terahertz wave 15 is converted into heat.

The absorbing sections 64 are arranged at uniform intervals in a row direction and in a column direction. Accordingly, the first metal layers 41 of the absorbing sections 64 are also arranged at uniform intervals. The interval of the first metal layers 41 is referred to as a third interval 66. By setting the third interval 66 to be shorter than the wavelength 15a of the terahertz wave 15, it is possible to easily diffract the terahertz wave 15. Further, by setting the third interval 66 to be shorter than a length that is twice the amplitude 15c of the terahertz wave 15, it is possible to easily diffract the terahertz wave 15. Further, the energy of the terahertz wave 15 is absorbed in the dielectric layer 40 with high efficiency. Accordingly, the terahertz wave detecting device 52 can detect the terahertz wave 15 with high accuracy.

As described above, according to the present embodiment, the following effects are obtained.

(1) According to the present embodiment, the absorbing sections 64 are arranged on the converting section 60. Further, since a portion between the adjacent absorbing sections 64 functions as a slit, the terahertz wave 15 that is incident onto the terahertz wave detecting device 52 enters the absorbing sections 64 with high efficiency. Accordingly, the terahertz wave detecting device 52 can convert the energy of the terahertz wave detecting device 52 into heat with high efficiency. As a result, the terahertz wave 15 can detect the light intensity of the terahertz wave 15 with high accuracy.

Fourth Embodiment

Figure 11A:
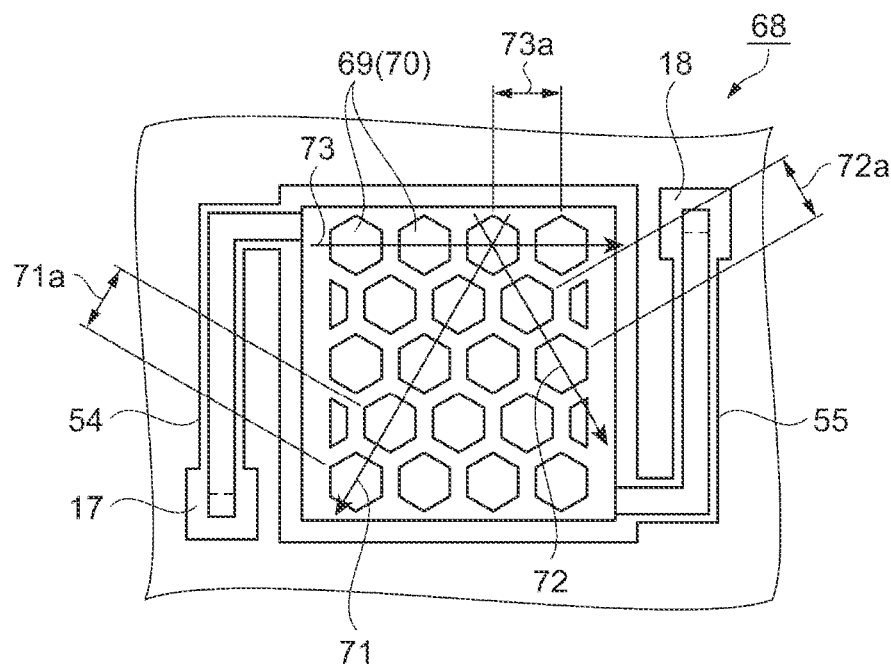
FIGS. 11A and 11B are plan views schematically illustrating a structure of a first detection element according to a fourth embodiment of the invention.
Figure 11B:
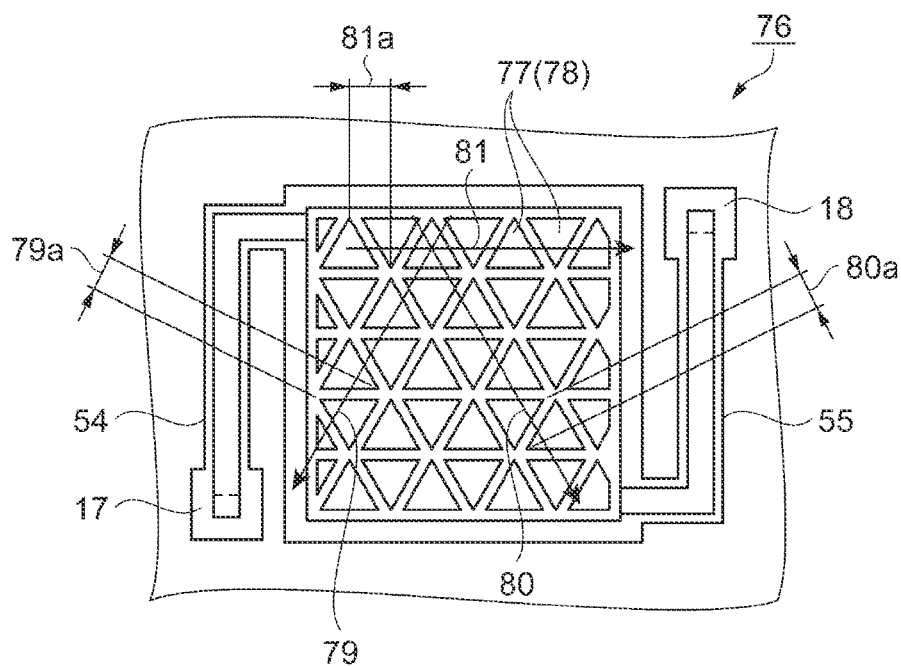

Next, an embodiment of a terahertz wave detecting device will be described with reference to FIGS. 11A and 11B. FIGS. 11A and 11B are plan views schematically illustrating a structure of a first detection element. The present embodiment is different from the third embodiment in that an arrangement pattern of the first detection elements is different. With respect to the same configurations as in the third embodiment, description thereof will not be repeated.

As shown in FIG. 11A, in a terahertz wave detecting device 68, first detection elements 69 and first metal layers 70 have a planar shape of a regular hexagon. The first detection elements 69 of the terahertz wave detecting device 68 are arranged in a honey comb structure in a planar view of the base substrate 2. Thus, it is possible to densely arrange the first detection elements 69.

In the terahertz wave detecting device 68, a first interval 71a of the first metal layers 70 in a first direction 71, a second interval 72a thereof in a second direction 72 that is inclined by an angle of 60° with respect to the first direction 71, and a third interval 73a thereof in a third direction 73 that is inclined by an angle of 120° with respect to the first direction 71 are the same. Thus, the terahertz wave detecting device 68 can detect the terahertz wave 15 without depending on a polarization direction, compared with the terahertz wave detecting device 52.

As shown in FIG. 11B, in a terahertz wave detecting device 76, first detection elements 77 and first metal layers 78 have a planar shape of an equilateral triangle. The first detection elements 77 of the terahertz wave detecting device 76 are arranged so that respective sides of the equilateral triangles face each other in planar view of the base substrate 2. Thus, it is possible to densely arrange the first detection elements 77.

In the terahertz wave detecting device 76, a first interval 79a of the first metal layers 78 in a first direction 79, a second interval 80a thereof in a second direction 80 that is inclined by an angle of 60° with respect to the first direction 79, and a third interval 81a thereof in a third direction 81 that is inclined by an angle of 120° with respect to the first direction 79 are the same. Thus, the terahertz wave detecting device 76 can detect the terahertz wave 15 without depending on a polarization direction, compared with the terahertz wave detecting device 52.

Fifth Embodiment

Figure 12A:
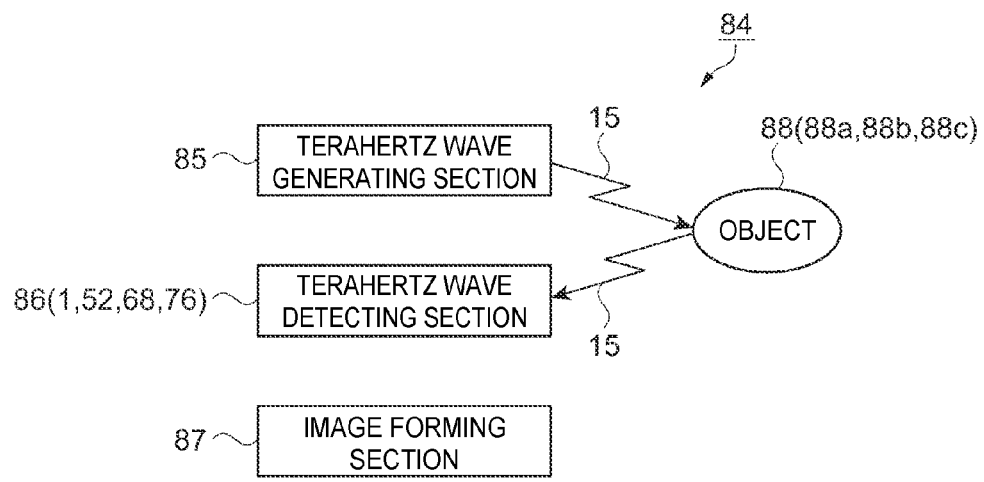
FIG. 12A is a block diagram illustrating a configuration of an imaging apparatus according to a fifth embodiment of the invention.
Figure 12B:
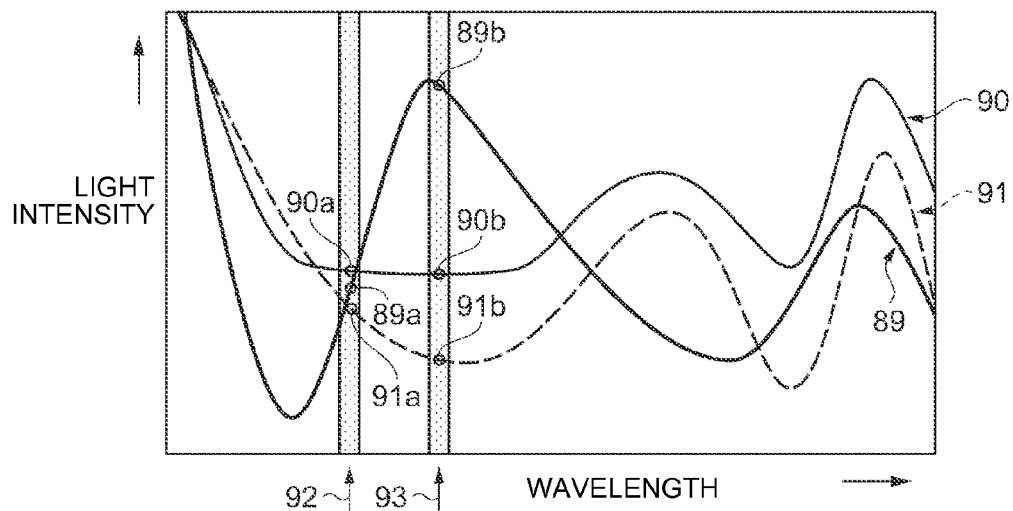
FIG. 12B is a graph illustrating a spectrum of an object in a terahertz band according to the fifth embodiment of the invention.
Figure 13:
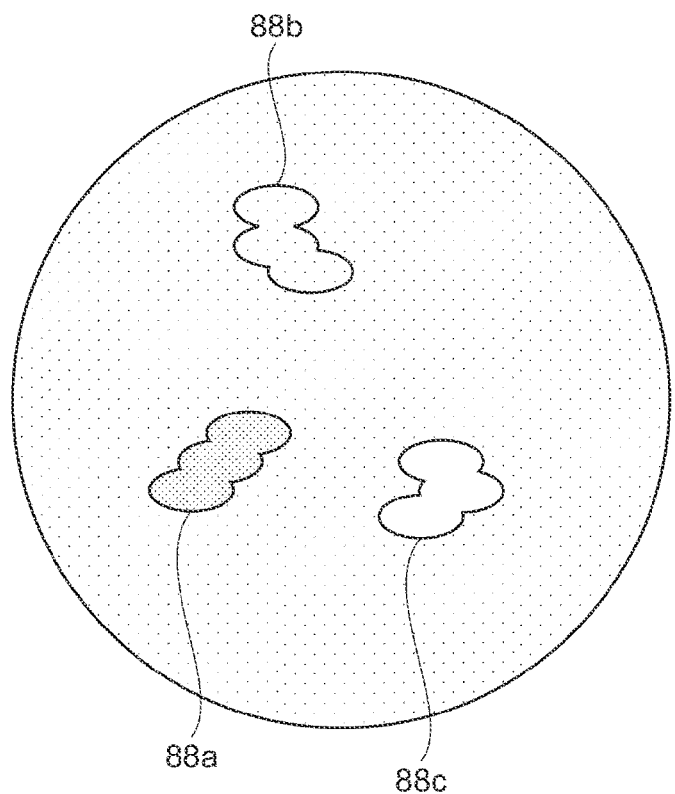
FIG. 13 is a diagram illustrating an image representing a distribution of materials A, B and C of an object.

Next, an embodiment of an imaging apparatus using a terahertz wave detecting device will be described with reference to FIGS. 12A and 12B and FIG. 13. FIG. 12A is a block diagram illustrating a configuration of the imaging apparatus. FIG. 12B is a graph illustrating a spectrum of an object in a terahertz band. FIG. 13 is a diagram illustrating an image representing a distribution of materials A, B and C of an object.

As shown in FIG. 12A, an imaging apparatus 84 includes a terahertz wave generating section 85, a terahertz wave detecting section 86 and an image forming section 87. The terahertz wave generating section 85 emits a terahertz wave 15 to an object 88. The terahertz wave detecting section 86 detects the terahertz wave 15 passing through the object 88 or the terahertz wave 15 reflected by the object 88. The image forming section 87 generates image data that is data on an image of the object 88 based on a detection result of the terahertz wave detecting section 86.

The terahertz wave generating section 85 can use a method that uses a quantum cascade laser, a photoconductive antenna and a short pulse laser, or a difference frequency generating method that uses a non-linear optical crystal, for example. As the terahertz wave detecting section 86, any one of the terahertz wave detecting device 1, the terahertz wave detecting device 52, the terahertz wave detecting device 68 and the terahertz wave detecting device 76 shown in the above description may be used.

The terahertz wave detecting section 86 includes the first detection elements 9 to the fourth detection elements 12, and the respective detection elements detect the terahertz waves 15 having different wavelengths. Accordingly, the terahertz wave detecting section 86 can detect the terahertz waves 15 having four types of wavelengths. The imaging apparatus 84 is a device that detects the terahertz waves 15 having two types of wavelengths using the first detection elements 9 and the second detection elements 10 to analyze the object 88.

It is assumed that the object 88 that is a target of spectral imaging includes a first material 88a, a second material 88b and a third material 88c. The imaging apparatus 84 performs spectral imaging of the object 88. The terahertz wave detecting section 86 detects the terahertz wave 15 reflected by the object 88. The types of the wavelengths used for a spectrum may be three or more types. Thus, it is possible to analyze various types of the object 88.

The wavelength of the terahertz wave 15 detected by the first detection element 9 is referred to as a first wavelength, and the wavelength detected by the second detection element 10 is referred to as a second wavelength. The light intensity of the first wavelength of the terahertz wave 15 reflected by the object 88 is referred to as a first intensity, and the light intensity of the second wavelength is referred to as a second intensity. The first wavelength and the second wavelength are set so that a difference between the first intensity and the second intensity can be noticeably recognized in the first material 88a, the second material 88b and the third material 88c.

In FIG. 12B, a vertical axis represents the light intensity of the detected terahertz wave 15, in which an upper side in the figure represents a strong intensity compared with a lower side. A horizontal axis represents the wavelength of the terahertz wave 15, in which a right side in the figure represents a long wavelength compared with a left side. A first characteristic line 89 is a line indicating a relationship between the wavelength and the light intensity of the terahertz wave 15 reflected by the first material 88a. Similarly, a second characteristic line 90 represents a characteristic of the second material 88b, and a third characteristic line 91 represents a characteristic of the third material 88c. On the horizontal axis, portions of a first wavelength 92 and a second wavelength 93 are clearly shown.

The light intensity of the first wavelength 92 of the terahertz wave 15 reflected by the object 88 when the object 88 is the first material 88a is referred to as a first intensity 89a, and the light intensity of the second wavelength 93 is referred to as a second intensity 89b. The first intensity 89a is a value of the first characteristic line 89 at the first wavelength 92, and the second intensity 89b is a value of the first characteristic line 89 at the second wavelength 93. A first wavelength difference that is a value obtained by subtracting the first intensity 89a from the second intensity 89b is a positive value.

Similarly, the light intensity of the first wavelength 92 of the terahertz wave 15 reflected by the object 88 when the object 88 is the second material 88b is referred to as a first intensity 90a, and the light intensity of the second wavelength 93 is referred to as a second intensity 90b. The first intensity 90a is a value of the second characteristic line 90 at the first wavelength 92, and the second intensity 90b is a value of the second characteristic line 90 at the second wavelength 93. A second wavelength difference that is a value obtained by subtracting the first intensity 90a from the second intensity 90b is zero.

The light intensity of the first wavelength 92 of the terahertz wave 15 reflected by the object 88 when the object 88 is the third material 88c is referred to as a first intensity 91a, and the light intensity of the second wavelength 93 is referred to as a second intensity 91b. The first intensity 91a is a value of the third characteristic line 91 at the first wavelength 92, and the second intensity 91b is a value of the third characteristic line 91 at the second wavelength 93. A third wavelength difference that is a value obtained by subtracting the first intensity 91a from the second intensity 91b is a negative value.

When the imaging apparatus 84 performs the spectral imaging of the object 88, first, the terahertz wave generating section 85 generates the terahertz wave 15. Further, the terahertz wave generating section 85 irradiates the object 88 with the terahertz wave 15. Further, the light intensity of the terahertz wave 15 reflected by the object 88 is detected by the terahertz wave detecting section 86. The detection result is transmitted to the image forming section 87. The irradiation of the object 88 with the terahertz wave 15 and the detection of the terahertz wave 15 reflected by the object 88 are performed for all the objects 88 positioned in an inspection region.

The image forming section 87 subtracts the light intensity at the first wavelength 92 from the light intensity at the second wavelength 93 using the detection result of the terahertz wave detecting section 86. Further, the image forming section 87 determines a portion where the subtraction result is a positive value as the first material 88a. Similarly, the image forming section 87 determines a portion where the subtraction result is zero as the second material 88b, and determines a portion where the subtraction result is a negative value as the third material 88c.

Further, as shown in FIG. 13, the image forming section 87 creates image data on an image representing the distribution of the first material 88a, the second material 88b and the third material 88c of the object 88. The image data is output to a monitor (not shown) from the image forming section 87, and the monitor displays the image representing the distribution of the first material 88a, the second material 88b and the third material 88c. For example, a region where the first material 88a is distributed is displayed as black, a region where the second material 88b is distributed is displayed as gray, and a region where the third material 88c is distributed is displayed as white, respectively. As described above, the imaging apparatus 84 can perform the determination of the identification of the respective materials that form the object 88 and the distribution measurement of the respective materials together.

The use of the imaging apparatus 84 is not limited to the above description. For example, when a person is irradiated with the terahertz wave 15, the imaging apparatus 84 detects the terahertz wave 15 that passes through the person or is reflected from the person. Then, the image forming section 87 processes the detection result of the terahertz wave 15, to thereby make it possible to determine whether the person has a pistol, a knife, illegal drugs or the like. As the terahertz wave detecting section 86, any one of the terahertz wave detecting device 1, the terahertz wave detecting device 52, the terahertz wave detecting device 68 and the terahertz wave detecting device 76 shown in the above description may be used. Accordingly, the imaging apparatus 84 can achieve high detection sensitivity.

Sixth Embodiment

Figure 14:
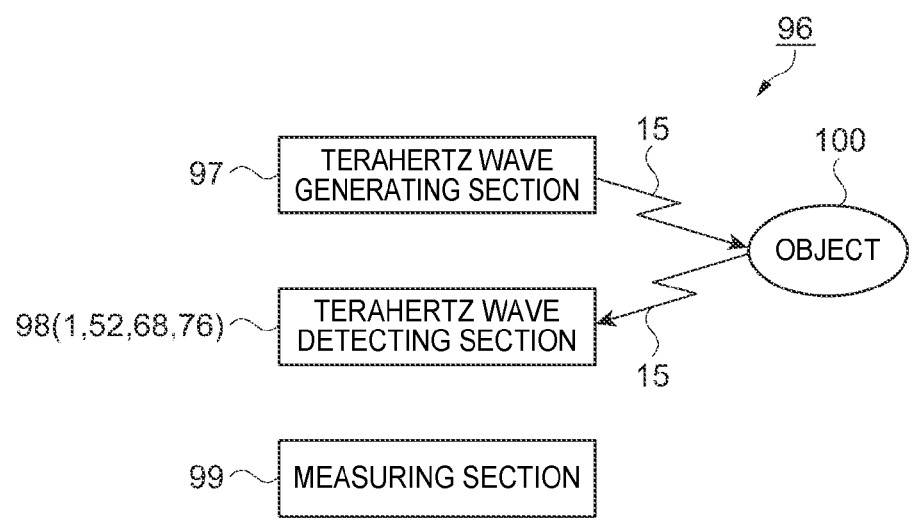
FIG. 14 is a block diagram illustrating a configuration of a measuring apparatus according to a sixth embodiment of the invention.

Next, an embodiment of a measuring apparatus using a terahertz wave detecting device will be described with reference to FIG. 14. FIG. 14 is a block diagram illustrating a structure of the measuring apparatus. As shown in FIG. 14, a measuring apparatus 96 includes a terahertz wave generating section 97 that generates a terahertz wave, a terahertz wave detecting section 98 and a measuring section 99. The terahertz wave generating section 97 irradiates an object 100 with the terahertz wave 15. The terahertz wave detecting section 98 detects the terahertz wave 15 passing through the object 100 or the terahertz wave 15 reflected by the object 100. As the terahertz wave detecting section 98, any one of the terahertz wave detecting device 1, the terahertz wave detecting device 52, the terahertz wave detecting device 68 and the terahertz wave detecting device 76 shown in the above description may be used. The measuring section 99 measures the object 100 based on the detection result of the terahertz wave detecting section 98.

Next, a use example of the measuring apparatus 96 will be described. When a spectral measurement of the object 100 is performed using the measuring apparatus 96, first, the terahertz wave 15 is generated by the terahertz wave generating section 97 to irradiate the object 100 with the terahertz wave 15. Further, the terahertz wave detecting section 98 detects the terahertz wave 15 passing through the object 100 or the terahertz wave 15 reflected by the object 100. The detection result is output from the terahertz wave detecting section 98 to the measuring section 99. The irradiation of the object 100 with the terahertz wave 15 and the detection of the terahertz wave 15 passed through the object 100 or the terahertz wave 15 reflected by the object 100 are performed for all the objects 100 positioned in a measurement range.

The measuring section 99 receives inputs of the light intensities of the terahertz waves 15 detected in the first detection elements 9 to the fourth detection elements 12 that form the respective pixels 4 from the detection result to perform analysis of ingredients, distributions and the like of the object 100. As the terahertz wave detecting section 98, any one of the terahertz wave detecting device 1, the terahertz wave detecting device 52, the terahertz wave detecting device 68 and the terahertz wave detecting device 76 shown in the above description may be used. Accordingly, the measuring apparatus 96 can achieve high detection sensitivity.

Seventh Embodiment

Figure 15:
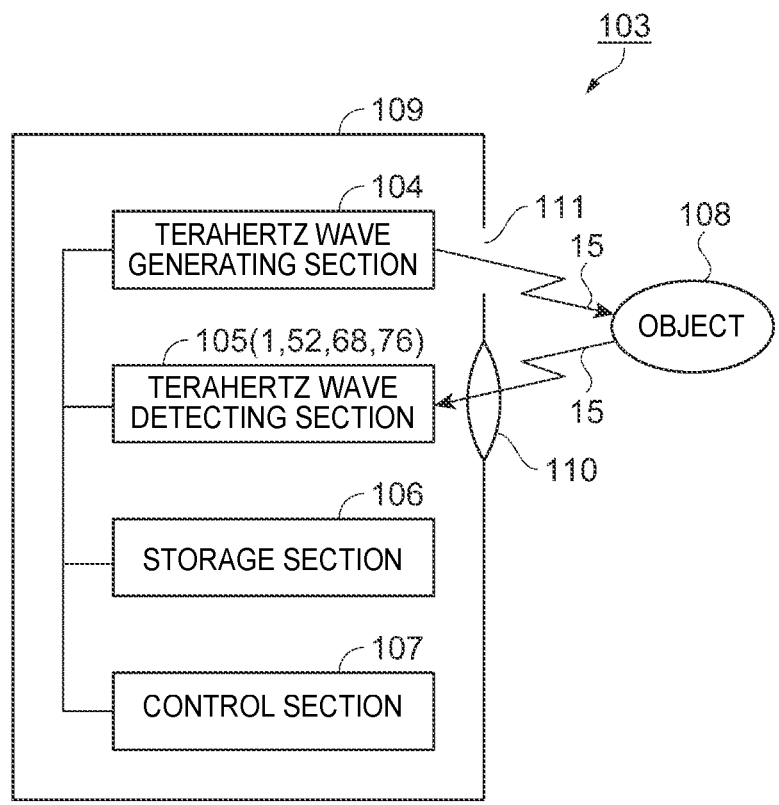
FIG. 15 is a block diagram illustrating a configuration of a camera according to a seventh embodiment of the invention.

An embodiment of a camera that uses a terahertz wave detecting device will be described with reference to FIG. 15. FIG. 15 is a block diagram illustrating a structure of a camera. As shown in FIG. 15, a camera 103 includes a terahertz wave generating section 104, a terahertz wave detecting section 105, a storage section 106 and a control section 107. The terahertz wave generating section 104 irradiates an object 108 with a terahertz wave 15. The terahertz wave detecting section 105 detects the terahertz wave 15 reflected by the object 108 or the terahertz waver 15 passing through the object 108. As the terahertz wave detecting section 105, any one of the terahertz wave detecting device 1, the terahertz wave detecting device 52, the terahertz wave detecting device 68 and the terahertz wave detecting device 76 shown in the above description may be used. The storage section 106 stores the detection result of the terahertz wave detecting section 105. The control section 107 controls operations of the terahertz wave generating section 104, the terahertz wave detecting section 105, and the storage section 106.

The camera 103 includes a housing 109, in which the terahertz wave generating section 104, the terahertz wave detecting section 105, the storage section 106 and the control section 107 are accommodated. The camera 103 includes a lens 110 that causes the terahertz wave 15 reflected by the object 108 to be image-formed in the terahertz wave detecting section 105. Further, the camera 103 includes a window section 111 through which the terahertz wave 15 output by the terahertz wave generating section 104 is output to the outside of the housing 109. A material of the lens 110 or the window section 111 is formed of silicon, quartz, polyethylene or the like that transmits the terahertz wave 15 to be diffracted. The window section 111 may have a configuration of a simple opening such as a slit.

Next, a use example of the camera 103 will be described. When the object 108 is imaged, first, the control section 107 controls the terahertz wave generating section 104 to generate the terahertz wave 15. Thus, the object 108 is irradiated with the terahertz wave 15. Further, the terahertz wave 15 reflected by the object 108 is image-formed in the terahertz wave detecting section 105 by the lens 110, and the terahertz wave detecting section 105 detects the object 108. The detection result is output to the storage section 106 from the terahertz wave detecting section 105 to be stored. The irradiation of the object 108 with the terahertz wave 15 and the detection of the terahertz wave 15 reflected by the object 108 are performed for all the objects 108 positioned in an imaging range. Further, the camera 103 may transmit the detection result to an external device such as a personal computer, for example. The personal computer may perform various processes based on the detection result.

As the terahertz wave detecting section 105 of the camera 103, any one of the terahertz wave detecting device 1, the terahertz wave detecting device 52, the terahertz wave detecting device 68 and the terahertz wave detecting device 76 shown in the above description may be used. Accordingly, the camera 103 can achieve high detection sensitivity.

The embodiments of the invention are not limited to the above-described embodiments, and various modifications or improvements may be made by those skilled in the art within the technical scope of the invention. Further, the invention may include a configuration having substantially the same function, way and result as in the above-described embodiments, or a configuration having the same object and effects as in the above-described embodiments. Furthermore, the invention may include a configuration in which a non-essential configuration in the above-described embodiments is replaced. Hereinafter, modification examples will be described.

Modification Example 1

In the first embodiment, the cavity 27 is formed between the base substrate 2 and the support substrate 25. When the detection sensitivity of the converting section 34 is sufficient, the converting section 34 may be provided on the base substrate 2. Thus, it is possible to remove the process of manufacturing the first pillar portion 17 and the second pillar portion 18, thereby easily manufacturing the terahertz wave detecting device 1.

Modification Example 2

In the first embodiment, the first metal layer 41 is layered on the dielectric layer 40. The first metal layers 41 may be formed in a lattice form, for example. The first metal layer may be patterned to easily reflect the terahertz wave 15.

Modification Example 3

In the first embodiment, the first detection elements 9 are arranged on the base substrate 2 in the lattice form in the horizontal and vertical directions. The terahertz wave 15 that passes through the first detection element 9 may be incident onto the adjacent first detection element 9, and the arrangement of the first detection elements 9 may be an arrangement pattern other than the lattice form. For example, the first detection elements 9 may be arranged in the same pattern as the pattern of the first detection elements 69 or the first detection elements 77 in the fourth embodiment. The first detection elements 9 may be arranged in a different repetitive pattern.

Modification Example 4

In the first embodiment, four types of detection elements of the first detection elements 9 to the fourth detection elements 12 are provided. The number of types of the detection elements may be one to three, or may be five or more. This may be similarly applied to the number of wavelengths of the terahertz wave 15 to be detected.

Modification Example 5

In the first embodiment, the terahertz wave 15 that travels toward the base substrate 2 from the side of the absorbing section 42 is diffracted by the absorbing section 42. The terahertz wave 15 that travels toward the absorbing section 42 from the base substrate 2 may be diffracted by the converting section 34. In this case, similarly, since the terahertz wave 15 is repeatedly reflected between the first metal layer 41 and the second metal layer 33, the dielectric layer 40 can absorb the terahertz wave 15 with high efficiency.

Modification Example 6

The metal pillar 49 (pillar portion) according to the second embodiment may be provided in the absorbing section 64 according to the third embodiment. Further, the metal pillar 49 may be provided in the first detection element 69 and the first detection element 77 according to the fourth embodiment. Further, the metal pillar 49 may be provided in a detection element having a different pattern shape. In this case, similarly, since the heat is suppressed from remaining in the absorbing section, the terahertz wave detecting device can convert the incident terahertz wave 15 into an electric signal with high responsiveness. Further, it is possible to allow the terahertz wave 15 to be reflected by the first metal layer and the second metal layer.

The entire disclosure of Japanese Patent Application No. 2013-118565, filed Jun. 5, 2013 is expressly incorporated by reference herein.

What is claimed is:

1. A terahertz wave detecting device comprising:
a substrate; and
a plurality of detection elements that is arranged above the substrate,
wherein the detection element includes
an absorbing section that absorbs a terahertz wave to generate heat, and
a converting section that converts the heat generated in the absorbing section into an electric signal,
wherein the absorbing section includes
a dielectric layer,
a first metal layer that is provided on a surface of the dielectric layer,
a second metal layer that is provided on the other surface of the dielectric layer, and
wherein the plurality of detection elements is arranged so that the terahertz wave that is diffracted between the adjacent absorbing sections is incident onto the dielectric layer, and
wherein a pillar portion that is made of metal and transfers the heat from the first metal layer to the second metal layer is provided between the first metal layer and the second metal layer.

2. The terahertz wave detecting device according to claim 1,
wherein the first metal layers are arranged being spaced from each other at a predetermined interval, and
wherein the interval is shorter than a wavelength in vacuum of the terahertz wave absorbed by the absorbing section.

3. A camera comprising:
a terahertz wave generating section that generates a terahertz wave;
a terahertz wave detecting section that detects the terahertz wave that is emitted from the terahertz wave generating section and passes through or is reflected from an object; and
a storage section that stores a detection result of the terahertz wave detecting section,
wherein the terahertz wave detecting section is the terahertz wave detecting device according to claim 2.

4. An imaging apparatus comprising:
a terahertz wave generating section that generates a terahertz wave;
a terahertz wave detecting section that detects the terahertz wave that is emitted from the terahertz wave generating section and passes through or is reflected from an object; and
an image forming section that forms an image of the object based on a detection result of the terahertz wave detecting section,
wherein the terahertz wave detecting section is the terahertz wave detecting device according to claim 2.

5. A measuring apparatus comprising:
a terahertz wave generating section that generates a terahertz wave;
a terahertz wave detecting section that detects the terahertz wave that is emitted from the terahertz wave generating section and passes through or is reflected from an object; and
a measuring section that measures the object based on a detection result of the terahertz wave detecting section,
wherein the terahertz wave detecting section is the terahertz wave detecting device according to claim 2.

6. The terahertz wave detecting device according to claim 1,
wherein the second metal layer is connected to a wiring that transmits the electric signal converted by the converting section.

7. A camera comprising:
a terahertz wave generating section that generates a terahertz wave;
a terahertz wave detecting section that detects the terahertz wave that is emitted from the terahertz wave generating section and passes through or is reflected from an object; and
a storage section that stores a detection result of the terahertz wave detecting section,
wherein the terahertz wave detecting section is the terahertz wave detecting device according to claim 6.

8. An imaging apparatus comprising:
a terahertz wave generating section that generates a terahertz wave;
a terahertz wave detecting section that detects the terahertz wave that is emitted from the terahertz wave generating section and passes through or is reflected from an object; and an image forming section that forms an image of the object based on a detection result of the terahertz wave detecting section,
wherein the terahertz wave detecting section is the terahertz wave detecting device according to claim 6.

9. A measuring apparatus comprising:
a terahertz wave generating section that generates a terahertz wave;
a terahertz wave detecting section that detects the terahertz wave that is emitted from the terahertz wave generating section and passes through or is reflected from an object; and
a measuring section that measures the object based on a detection result of the terahertz wave detecting section,
wherein the terahertz wave detecting section is the terahertz wave detecting device according to claim 6.

10. The terahertz wave detecting device according to claim 1,
wherein the width of the pillar portion in a planar view of the substrate is from 1/50 to 1/5 of the length of the first metal layer and is from 1/50 to 1/5 of the length of the second metal layer.

11. The terahertz wave detecting device according to claim 1, further comprising:
a support substrate that supports the absorbing section and the converting section; and
a supporting section that supports the support substrate and the substrate to be spaced from each other.

12. The terahertz wave detecting device according to claim 11,
wherein a material of the dielectric layer is silicon dioxide,
wherein the supporting section includes a pillar arm portion that is connected to the support substrate, and
wherein one detection element is provided on the support substrate, and the length of the first metal layer and the length of the dielectric layer in an arrangement direction of the detection elements are shorter than the wavelength in vacuum of the terahertz wave absorbed by the absorbing section and are longer than 10 μm.

13. A camera comprising:
a terahertz wave generating section that generates a terahertz wave;
a terahertz wave detecting section that detects the terahertz wave that is emitted from the terahertz wave generating section and passes through or is reflected from an object; and
a storage section that stores a detection result of the terahertz wave detecting section,
wherein the terahertz wave detecting section is the terahertz wave detecting device according to claim 1.

14. An imaging apparatus comprising:
a terahertz wave generating section that generates a terahertz wave;
a terahertz wave detecting section that detects the terahertz wave that is emitted from the terahertz wave generating section and passes through or is reflected from an object; and
an image forming section that forms an image of the object based on a detection result of the terahertz wave detecting section,
wherein the terahertz wave detecting section is the terahertz wave detecting device according to claim 1.

15. A measuring apparatus comprising:
a terahertz wave generating section that generates a terahertz wave;
a terahertz wave detecting section that detects the terahertz wave that is emitted from the terahertz wave generating section and passes through or is reflected from an object; and
a measuring section that measures the object based on a detection result of the terahertz wave detecting section,
wherein the terahertz wave detecting section is the terahertz wave detecting device according to claim 1.

16. A terahertz wave detecting device comprising:
a substrate;
a plurality of detection elements that is arranged above the substrate;
a support substrate that supports the absorbing section and the converting section; and
a supporting section that supports the support substrate and the substrate to be spaced from each other,
wherein the detection element includes
an absorbing section that absorbs a terahertz wave to generate heat, and
a converting section that converts the heat generated in the absorbing section into an electric signal,
wherein the absorbing section includes
a dielectric layer,
a first metal layer that is provided on a surface of the dielectric layer,
a second metal layer that is provided on the other surface of the dielectric layer, and
wherein the plurality of detection elements is arranged so that the terahertz wave that is diffracted between the adjacent absorbing sections is incident onto the dielectric layer,
wherein a material of the dielectric layer is silicon dioxide,
wherein the supporting section includes a pillar arm portion that is connected to the support substrate, and
wherein one detection element is provided on the support substrate, and the length of the first metal layer and the length of the dielectric layer in an arrangement direction of the detection elements are shorter than a length that is twice the length of the amplitude of the terahertz wave absorbed by the absorbing section and are longer than 10 μm.

* * * * *